United States Patent
Ueno et al.

(10) Patent No.: US 7,911,659 B2
(45) Date of Patent: Mar. 22, 2011

(54) DOCUMENT PROCESSING APPARATUS WITH IMAGE SCANNING RESOLUTION CORRECTION FUNCTION AND METHOD THEREOF

(75) Inventors: Sueo Ueno, Mishima (JP); Kunihiko Miura, Hiratsuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1093 days.

(21) Appl. No.: 11/626,490

(22) Filed: Jan. 24, 2007

(65) Prior Publication Data
US 2008/0174832 A1    Jul. 24, 2008

(51) Int. Cl.
H04N 1/04    (2006.01)
(52) U.S. Cl. ........ 358/474; 358/486; 358/444; 358/475; 358/497; 358/406
(58) Field of Classification Search ............ 358/497, 358/474, 406, 475, 504, 505, 486, 444; 399/212, 399/211; 250/234–236, 239, 216; 382/312, 382/318, 319; 348/203
See application file for complete search history.

(56) References Cited

U.S. PATENT DOCUMENTS

| | | | | |
|---|---|---|---|---|
| 5,672,866 A | * | 9/1997 | Messina | 250/252.1 |
| 6,512,539 B1 | * | 1/2003 | Dance et al. | 348/203 |
| 2009/0003861 A1 | * | 1/2009 | Motoyama | 399/51 |

FOREIGN PATENT DOCUMENTS

| | | |
|---|---|---|
| JP | 06-054124 | 2/1994 |
| JP | 07-140565 | 6/1995 |
| JP | 2001-337401 | 12/2001 |

* cited by examiner

*Primary Examiner* — Cheukfan Lee
(74) *Attorney, Agent, or Firm* — Turocy & Watson, LLP

(57) ABSTRACT

An embodiment of a document processing apparatus that has a function of correcting image scanning resolution according to the present invention includes a first carriage mounted with a first reflector that reflects reflected light from a document fixed on an original placing glass plate in a predetermined direction and a second carriage mounted with a second reflector that changes a direction of incident light from the first reflector by 180°. A correction distance from a default position of the second carriage with which predetermined resolution is obtained in plural scanning positions of the first carriage is calculated. An operation of the second carriage is controlled based on the correction distance obtained.

31 Claims, 18 Drawing Sheets

DOCUMENT PROCESSING APPARATUS WITH IMAGE SCANNING RESOLUTION CORRECTION FUNCTION AND METHOD THEREOF

BACKGROUND OF THE INVENTION

1. Field of the Invention

The present invention relates to a document processing apparatus with a function of scanning an image shown on a document such as an original and a method of scanning the image. More particularly, the present invention relates to a document processing apparatus with image scanning resolution correction function and a method of correcting image scanning resolution.

2. Description of the Related Art

A document processing apparatus with a function of scanning an image shown on a document is an arbitrary appropriate document processing apparatus in this technical field. This type of document processing apparatuses include, for example, a scanner apparatus, a copier, a facsimile apparatus, and a multi-function peripheral that that has two or more functions among functions of these apparatuses.

A document processing apparatus of an scanning scheme for a placed original on the glass with a function of scanning an image shown on a document includes a light source that irradiates light on an original placed on an original placing glass plate, on which an original is placed, three mirrors that guide reflected light of the light irradiated on the original in a predetermined direction, and a lens to which output light from a last mirror among these mirrors is input. A portion of the original illuminated by the light source is imaged on a light receiving surface of an optical sensor such as a CCD by the lens. Image data converted into an electric signal is outputted from the optical sensor. Usually, among the three mirrors, a first mirror that first receives reflected light of the light irradiated on the original is provided in a first carriage. Both second and third mirrors are provided in a second carriage. Further, usually, the light source is provided in the first carriage.

In this type of the document processing apparatus with the function of scanning an image shown on a document, a sum of an optical path length from an upper surface of the original placing glass plate, on which an original is placed, i.e., an original surface as a scanning object to a reflecting point of the first mirror, an optical path length from the reflecting point of the first mirror to a reflecting point of the second mirror, an optical path length from the reflecting point of the second mirror to a reflecting point of the third mirror, and an optical path length from the reflecting point of the third mirror to the lens needs to be a value within a predetermined range. This is for the purpose of securing predetermined resolution and keeping image magnification substantially constant.

For example, when a document is placed on the original placing glass plate, on which an original is placed, to scan the document, the first carriage is moved to scan the document. In this case, when the second carriage remains stationary, according to the movement of the first carriage, the optical path length from the reflecting point of the first mirror to the reflecting point of the second mirror and the optical path length from the reflecting point of the third mirror to the lens change. Therefore, the sum of the optical path lengths changes. When the sum of the optical path lengths changes, an image on the light receiving surface of the optical sensor is not appropriately imaged to cause so-called out-of-focus. As a result, the predetermined resolution of the document processing apparatus with the function of scanning an image shown on a document may not be secured.

To prevent such a situation, when scanning is performed using the first carriage to scan the document, to keep the sum of the optical path lengths constant, the second carriage is moved in parallel to and in an identical direction with the first carriage at scanning speed a half of scanning speed of the first carriage. To realize this, a mechanism described below is disclosed in Jpn. Pat. Publication (Kokai) No. H7-140565. The first carriage and the second carriage are driven by one driving motor via a driving pulley and move. The driving pulley includes a combination of large and small two pulleys that coaxially have a diameter ratio of 1:2. The first carriage is driven via the pulley with the large diameter and the second carriage is driven via the pulley with the small diameter. By adopting such a mechanism, it is possible to set a ratio of moving speed of the first carriage and moving speed of the second carriage as 2:1.

However, when a member deciding a moving direction of the carriages, for example, carriage sliding rails, and the original placing glass plate, on which an original is placed, are not parallel, the moving direction of the carriages and the original are not parallel. Thus, the sum of the optical path length is not kept constant even by the mechanism for moving the second carriage at scanning speed a half of scanning speed of the first carriage. When a dimension error of a member constituting a part of the document processing apparatus is large, the same situation occurs. As a result, there is a problem in that it is impossible to secure the predetermined resolution and keep image magnification constant.

Other than the scanning scheme for a placed original on the glass for scanning a document by moving the carriages in a state in which an original is placed stationary on the original placing glass plate, there is a system for scanning a document by conveying an original in a state in which the two carriages are kept stationary. The latter system is called an scanning scheme for fed original and is sometimes called a sheet-through scanning system by those having ordinary skill in the art. Usually, an original is conveyed by a document feeder. In the scanning scheme for fed original, it is possible in principle to scan an original, which passes over a glass plate, at predetermined resolution by arranging two carriages in appropriate positions. Usually, the positions of the two carriages are decided to scan the original in a place substantially in contact with the upper surface of the glass plate. However, for example, when a document as a scanning object is conveyed apart from the glass surface, it may be impossible to scan the document at the predetermined resolution.

As described above, scanning resolution as designed may not be obtained because of a dimension error of members constituting the document processing apparatus, an assembly error in assembling the apparatus, or the like. Recently, there is an increasing need for a document processing apparatus with excellent scanning resolution. However, member with high accuracy and skilled manufacturing techniques are necessary to embody the document processing apparatus with high resolution. This causes an increase in cost.

Therefore, a document processing apparatus with which predetermined scanning resolution is obtained even if there are some dimension errors of members, assembly errors, and the like is desired.

DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE INVENTION

Figure 1A:
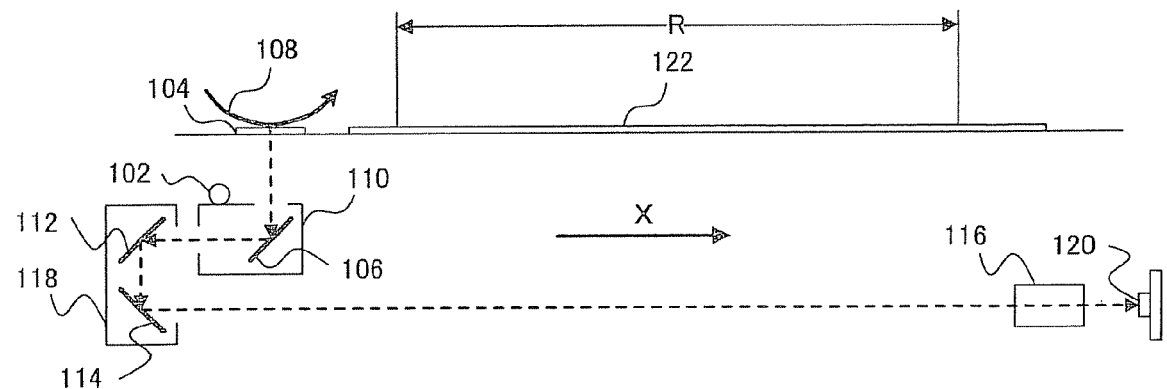
FIG. 1A is a block diagram showing an example of a functional structure of a document scanning optical system of a document processing apparatus according to an embodiment of the present invention.

Throughout this description, the embodiments and examples shown should be considered as exemplars, rather than limitations on the apparatus of the present invention.

Embodiments of the present invention will be hereinafter explained referring to the drawings as appropriate.

An example of a functional structure of a document scanning optical system of a document processing apparatus according to an embodiment of the present invention is shown in FIG. 1A. The structure shown in the figure supports both an original fixing and scanning mode for setting a document as an original on an original placing glass plate and scanning the original and an original conveying and scanning mode for conveying an original with a document feeder (not shown) and scanning the original. Without the intension of limitation, in the following explanation, the document feeder is assumed to be an automatic document feeder (hereinafter also referred to as ADF) that automatically conveys an original. A light source 102 illuminates a document as an object of scanning. It is possible to use a light source such as a Xenon lamp for the light source 102. In the figure, a path of reflected light from the document illuminated by the light source 102 is indicated by a broken line.

In performing original scanning with an scanning scheme for fed original by conveying an original with the document feeder, irradiated light from the light source 102 to the original is transmitted through a through-read glass 104 and reflected light from the original to a first mirror 106 is transmitted through the through-read glass 104. In FIG. 1A, a locus 108 of the original in the case of original conveying and scanning for scanning the original using the ADF is shown above the through-read glass 104. Those having ordinary skill in the art refer to original scanning by the scanning scheme for fed original as sheet-through scanning as well.

The first mirror 106 is mounted on a first carriage 110. In general, the light source 102 is also mounted on this first carriage 110. In general, the first mirror 106 reflects the reflected light from the document illuminated by the light source 102 to change a traveling direction of the reflected light by 90°. The light reflected by the first mirror 106 is made incident on a second mirror 112. In general, the second mirror 112 reflects the incident light from the first mirror 106 to change a traveling direction thereof by 90°. Moreover, the light reflected by the second mirror 112 is made incident on a third mirror 114. In general, the third mirror 114 reflects the incident light from the second mirror 112 to change a traveling direction thereof by 90°. As a result, the traveling direction of the light reflected by the first mirror 106 is changed by 180° by the second mirror 112 and the third mirror 114. The second mirror and the third mirror are mounted on the second carriage 118. The light reflected by the third mirror 114 is guided to a lens 116.

The lens 116 is a convergent lens and converges light made incident thereon to make the light incident on an optical sensor 120. The light made incident on the lens 116 is light reflected from a part of the original illuminated by the light source 102. If the optical system described above is appropriately aligned, the part of the original illuminated by the light source 102 is imaged on the optical sensor 120. As the optical sensor 120, it is possible to use, for example, a CCD or CMOS sensor. Since a dimension of the optical sensor 120 is small compared with a size of the original, the optical system is a reduced optical system.

The original placing glass plate 122 has a function of fixing a position of an original that is placed thereon and scanned. When an original is set on the original placing glass plate 122, a portion of the original exceeding an original scanning range R in a sub-scanning direction is not scanned. In the original fixing and scanning mode for setting an original on the original placing glass plate 122 and scanning the original, the first carriage 110 and the second carriage 118 move in an X direction shown in the figure at predetermined speed to scan the original, respectively. Although it is obvious for those having ordinary skill in the art, the movement of the first carriage 110 and the second carriage 118 is not the essence of the original scanning mode and, in the original scanning mode, movement of a first reflector such as the first mirror 106 usually mounted on the first carriage 110 and a second reflector usually mounted on the second carriage 118 and constituted by, for example, a combination of the second mirror 112 and the third mirror 114 is necessary. As those having ordinary skill in the art understand, the X direction in the figure is the sub-scanning direction and a main scanning direction is a direction perpendicular to the paper surface.

Figure 1B:
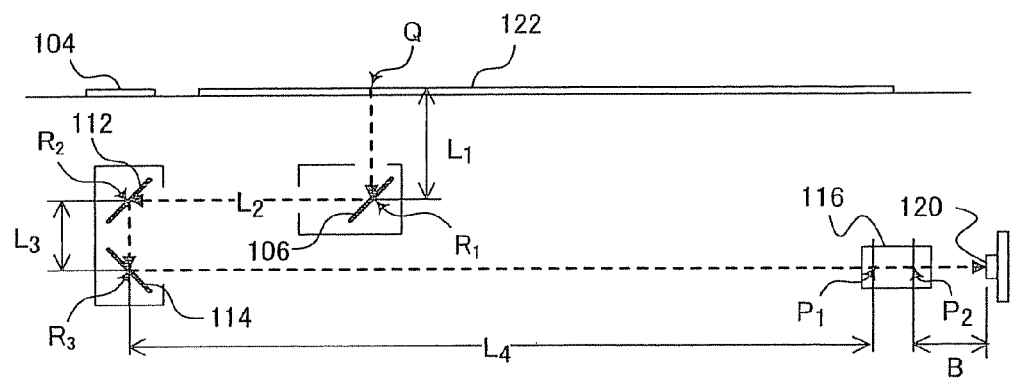
FIG. 1B is a diagram for explaining an optical path lengths in the optical system shown in FIG. 1A.

FIG. 1B is a diagram for explaining an optical path length in the optical system of the document processing apparatus according to the embodiment of the present invention shown in FIG. 1A. The optical path length is a value obtained by integrating a product of the length of an optical path and an index of refraction of a medium, through which light progresses along the optical path, from a start point to an end point of the beam. A point Q is a position of a document as a scanning object and is optically an object point in this optical system that images an image of the document on the optical sensor. The document as a scanning object is usually placed in close contact with the original placing glass plate 122. In the figure, the point Q is set on the original placing glass plate 122 such that a side of the original on which the document is shown is placed on the original placing glass plate 122 side. Reflected light from the point Q is made incident on a reflection point $R_1$ on the first mirror 106. A mechanical length from the point Q to the point $R_1$ is $L_1$. The original placing glass plate 122 is present between the point Q and the point $R_1$. An index of refraction n of the glass is about 1.5, which is different from an index of refraction 1 in the vacuum. The air or an inert gas is charged in a portion of an optical path $QR_1$ other than the original placing glass plate 122. In practice, the index of refraction may be treated as 1. Therefore, when the thickness of the original placing glass plate 122 is d, an optical path length $A_1$ from the point Q to the point $R_1$ is $A_1 = n \cdot d + (L_1 - d) = L_1 + (n-1) \cdot d$.

A mechanical length from the reflection point $R_1$ on the first mirror 106 to a reflection point $R_2$ on the second mirror 112 is $L_2$. An optical length $A_2$ of an optical path $R_1R_2$ is $A_2 = L_2$. A mechanical length from the reflection point $R_2$ on the second mirror 112 to a reflection point $R_3$ on the third mirror 114 is $L_3$. An optical path length $A_3$ of an optical path $R_2R_3$ is $A_3 = L_3$.

A mechanical length from the reflection point $R_3$ on the third mirror 114 to a principal point in object space $P_1$ of the lens 116 is $L_4$. An optical path length $A_4$ of an optical path $R_3P_1$ is $A_4 = L_4$.

As a result, an optical path length A from the object point Q to the lens 116 treated as a thin lens is given by Equation (1) shown below.

$$A = A_1 + A_2 + A_3 + A_4 = L_1 + L_2 + L_3 + L_4 + (n-1) \cdot d \tag{1}$$

A mechanical length from a principal point in image space $P_2$ of the lens 116 to a photosensitive surface of the optical sensor 120 is B and an optical path length is also B.

When a focal length of the lens 116 is f, according to the basic geometrical optics, when Equation (2) below is satisfied, a document at the object point Q is accurately imaged on the photosensitive surface of the optical sensor at the magnification of B/A and best resolution is obtained.

$$1/A + 1/B = 1/f \tag{2}$$

In this embodiment, the focal length f of the lens 116 and a value of B are predetermined fixed values, respectively. Therefore, to satisfy Equation (2), it is necessary to set the optical path length A to $A_0$, which is a value satisfying Equation (2).

However, to obtain the predetermined resolution in the embodiment of the present invention, it is not always necessary to strictly satisfy $A = A_0$. The object point Q only has to be in a range of a so-called depth of field of the optical system. When a front depth of field is $D_f$ and a rear depth of field is $D_r$, the predetermined resolution is obtained if $A_0 - D_f < A < A_0 + D_r$ is satisfied.

In this embodiment, thickness d and an index of refraction n of the original placing glass plate 122 and values of $A_3$ and $L_3$ are predetermined fixed values, respectively. Eventually, to satisfy Equation (2), it is necessary to set a value of $A_1 + A_2 + A_4$, i.e., a value of $L_1 + L_2 + L_4$ to an appropriate value.

In the above explanation of the optical path length using FIG. 1B, the document as a scanning object is placed on the original placing glass plate 122. However, the same explanation applies when the document is placed on the through-read glass 104 rather than the original placing glass plate 122 and it is necessary to set a value of $L_1 + L_2 + L_4$ to an appropriate value.

Figure 2:
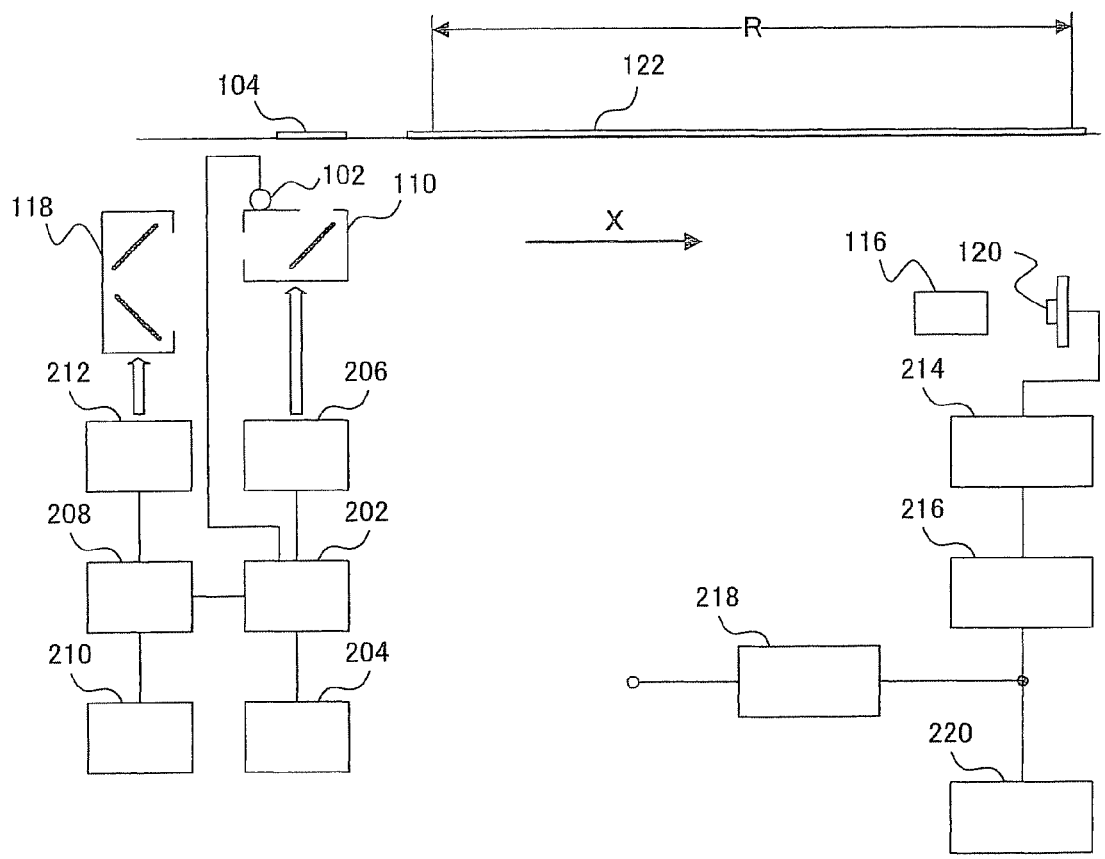
FIG. 2 is a block diagram showing an example of a functional structure of an electric system for document scanning in the document processing apparatus according to the embodiment of the present invention.

An example of a functional structure of an electric system for document scanning in the document processing apparatus according to the embodiment of the present invention will be explained using FIG. 2. When an instruction for document scanning is inputted to the document processing apparatus, information on the instruction is transmitted to a first carriage-driving control unit 202 and a second carriage-driving control unit 208. The first carriage-driving control unit 202, which has received the information on the document scanning instruction, transmits driving information to a first carriage driving unit 206 with reference to a memory 204. The first carriage driving unit 206 moves the first carriage 110 to a scanning start position thereof. The first carriage-driving control unit performs preparation for turning on the light source 102. The second carriage-driving control unit 208 operates in the same manner as the first carriage-driving control unit 202 except the control of the light source 102. The second carriage-driving control unit 208, which has received the information on the document scanning information, transmits driving information to a second carriage driving unit 212 with reference to a memory 210. The second carriage driving unit 212 moves the second carriage 118 to a position at scanning start time. Default positions at the scanning start time of the first carriage 110 and the second carriage are stored in the memory 204 and the memory 210, respectively. The memory 204 includes a nonvolatile memory, and in some cases, includes a nonvolatile rewritable memory such as a flash memory. The memory 210 includes a nonvolatile rewritable memory such as a flash memory. The first carriage driving unit 206 and the second carriage driving unit 212 include driving sources such as pulse motors and mechanisms for moving the first carriage 110 and the second carriage according to the rotation of the motors, respectively.

When the respective carriages move to the position at the scanning start time, the first carriage-driving control unit 202 turns on the light source 102 and scanning of a document is started.

When the scanning of the document is started, in the scanning scheme for a placed original on the glass, the first carriage 110 and the second carriage 118 are driven by the first carriage driving unit 206 and the second carriage driving unit 212, respectively. In this case, the first carriage driving unit 206 is controlled by the first carriage-driving control unit 202. The first carriage-driving control unit 202 performs the control with reference to the memory 204. Similarly, the second carriage driving unit 212 is controlled by the second carriage-driving control unit 208. The second carriage-driving control unit 208 acquires positional information of the first carriage from the first carriage-driving control unit 202 and performs the control with reference to the memory 210 as appropriate. Operations of the first carriage 110 and the second carriage 118 after the scanning of the document is started will be described in detail later. Data for moving, in a default state, the second carriage 118 at speed a half of speed of the first carriage 110 and in a direction identical with that of the first carriage 110 is stored in the memory 210. Although not shown in the figure, the driving system for the carriages explained above includes one or plural processors, for example, CPUs.

In the scanning scheme for fed original, even if the scanning of the document is started, the respective carriages do not move from the positions at the scanning start time.

When the scanning of the document is started, an optical image of the document in the main scanning direction is inputted to the optical sensor 120 for each line. An analog image signal of the document converted into an electric signal is outputted from the optical sensor 120 for each line. The analog image signal outputted from the optical sensor 120 is amplified as required and is converted into digital data by an A/D converting unit 214. Shading of an image signal converted into the digital data by the A/D converting unit 214 is corrected by a shading correcting unit 216. A circuit 218 that detects amplitude of an envelope of a response outputted from the optical sensor may be provided. An output in the main scanning direction is serially outputted from the optical sensor 120 for each line. Taking into account a case in which a test chart for evaluating resolution is set to be inclined with respect to a predetermined direction, the circuit 218 that detects the amplitude of the envelope may be constituted to detect only a response in a limited predetermined portion in the main scanning direction. In FIG. 2, the circuit 218 that detects the amplitude of the envelope is provided at a post stage of the shading correcting unit 216. However, the circuit 218 is not limited to be provided in this position. As those having ordinary skill in the art would understand, when the amplitude of the envelope is detected by a digital technique, when the amplitude is converted into a digital signal by the A/D converting unit 214 and then detected by an analog technique, it is possible to provide a circuit that detects the amplitude of the envelope in an arbitrary appropriate position that is in a state in which a response outputted from the optical sensor is not converted into a digital signal. An output of the shading correcting unit 216 is inputted to an image processing unit 220 at a post stage.

Operations of the first carriage 110 and the second carriage 118 after the scanning of the document is started are different between the case of the scanning scheme for a placed original on the glass for placing a document as a scanning object on the original placing glass plate 122 and the case of the scanning scheme for fed original for setting a document as a scanning object on an ADF.

First, the case of the scanning scheme for a placed original on the glass for placing a document on the original placing glass plate 122 and scanning the document will be explained with reference to FIGS. 3A to 3C, FIGS. 4A to 4C, and FIGS. 5A to 5C. In these figures, optical path lengths are shown instead of mechanical lengths.

Figure 3A:
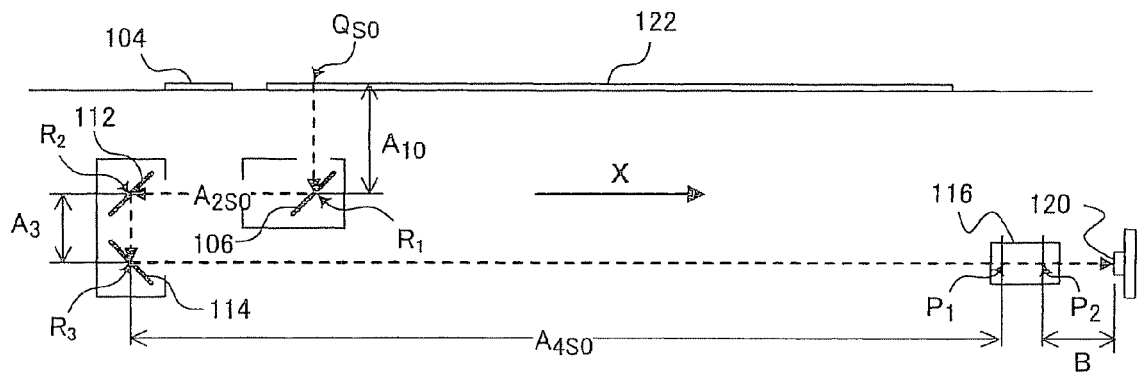
FIGS. 3A to 3C are diagrams for explaining a change in an optical path length in executing original fixing and scanning when an original placing glass plate and a moving direction of two carriages are parallel in the document processing apparatus according to the embodiment of the present invention.
Figure 3B:
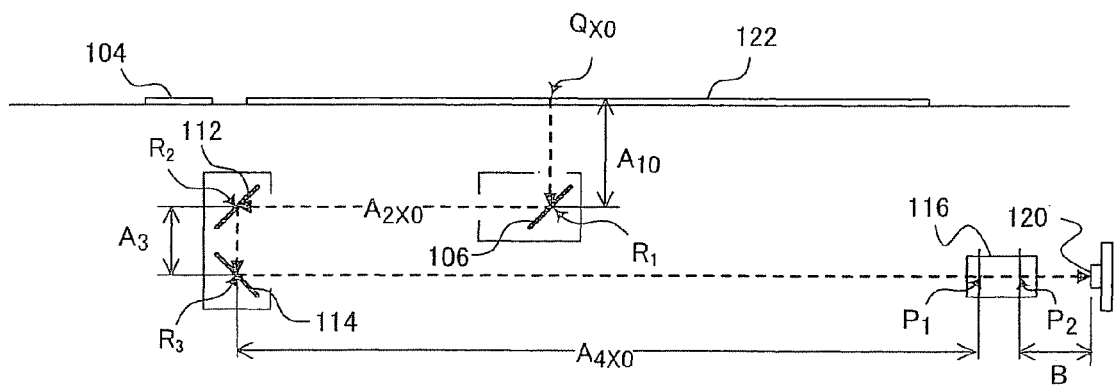
Figure 3C:
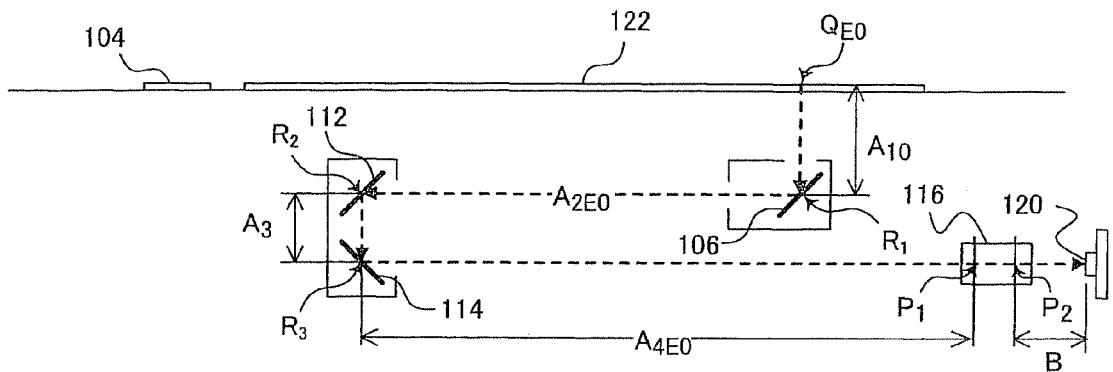

In FIGS. 3A to 3C, the original placing glass plate 122 and the moving direction X of the first carriage 110 and the second carriage 118 are parallel. Therefore, the optical path length $A_1$ of the optical path $QR_1$ is a fixed value $A_{10}$ regardless of a position of the first carriage 110. FIG. 3A shows positions of the respective carriages at the scanning start point of the document. The first carriage 110 is in a position of $x=X_{1S}$ and the second carriage 118 is in a position of $X=X_{2S}$. An optical path length $A_{S0}$ in this state is $A_{S0}=A_{10}+A_{2S0}+A_3+A_{4S0}$.

When the scanning of the document is started, the first carriage 110 starts movement from the position at the scanning start point in a forward direction of x in the figure (a right direction in the figure) at appropriate constant speed $V_1$. At this point, the second carriage 118 starts movement from the position at the scanning start point in a direction identical with that of the first carriage 110, i.e., the forward direction of x at speed $V_2=V_1/2$, which is a half of the moving speed of the first carriage 110. The two carriages move at the moving speeds, respectively, until the first carriage 110 reaches an end of the document as the scanning object. Such operations of the first carriage 110 and the second carriage 118 may be hereinafter referred to as operations according to a default setting state.

FIG. 3B shows positions of the respective carriages at a point when time $t_x$ has elapsed from the start of the document scanning. When the scanning start point is assumed to be a reference, the first carriage 110 and the second carriage 118 move in the forward direction of x by $V_1 \cdot t_x$ and $V_1 \cdot t_x/2$, respectively. Therefore, an optical path length $A_{2X0}$ of the optical path $R_1R_2$ is $A_{2X0}=A_{2S0}+(V_1-V_1/2)\cdot t_x=A_{2S0}+(V_1/2)\cdot t_x$. An optical path length $A_{4X0}$ of $R_3P_1$ is $A_{4S0}-(V_1/2)\cdot t_x$. As a result, an optical path length $A_{X0}$ in this state is $A_{X0}=A_{10}+A_{2X0}+A_3+A_{4X0}=A_{10}+\{A_{2S0}+(V_1/2)\cdot t_x\}+A_3+\{A_{4S0}-(V_1/2)\cdot t_x\}=A_{10}+$ $A_{2S0}+A_3+A_{4S0}$. This is equal to the optical path length $A_{S0}$ at the scanning start time of the document. This means that the optical path length A from the object point Q to the principal point in object space $P_1$ of the lens 116 is fixed during scanning of the document regardless of positions of the first carriage 110 and the second carriage 118. Therefore, resolution does not change during the scanning of the document. If the optical path length A is set appropriate, the predetermined resolution is obtained over an entire area of a scanning range of the document.

FIG. 3C shows positions of the respective carriages at the scanning end point of the document. It goes without saying that an optical path length in this state is equal to the optical path length $A_{S0}$ at the scanning start point of the document.

The case of the scanning scheme for a placed original on the glass for placing a document on the original placing glass plate 122 and scanning the document is explained above with reference to FIGS. 3A to 3C. In FIGS. 3A to 3C, the explanation is on condition that the original placing glass plate 122 and the moving direction X of the first carriage 110 and the second carriage 118 are parallel.

Figure 4A:
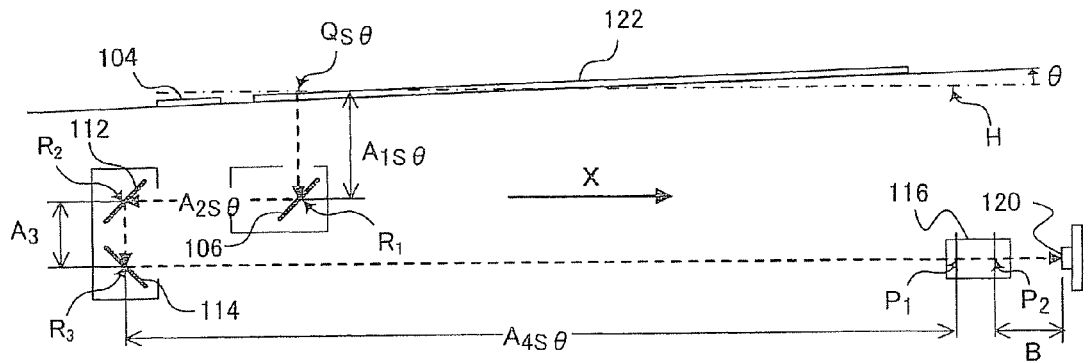
FIGS. 4A to 4C and FIGS. 5A to 5C are diagrams for explaining a change in an optical path length in executing original fixing and scanning when the original placing glass plate and a moving direction of the two carriages are not parallel in the document processing apparatus according to the embodiment of the present invention.
Figure 4B:
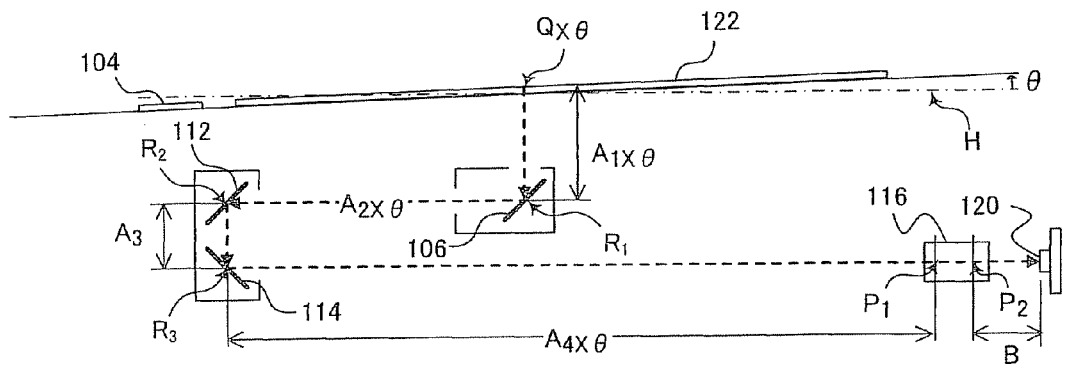
Figure 4C:
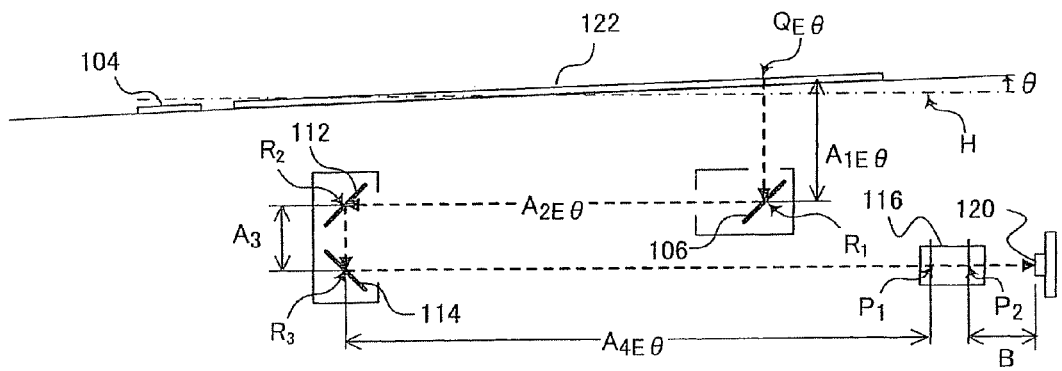

A case in which there is an inclination between the original placing glass plate 122 and the moving direction x of the first carriage 110 and the second carriage 118 will be explained with reference to FIGS. 4A to 4C. An inclination of the original placing glass plate 122 is set as θ with the moving direction x of the first carriage 110 and the second carriage 118 as a reference. In FIGS. 4A to 4C, the inclination θ of the original placing glass plate 122 is a positive value. FIG. 4A shows positions of the respective carriages at the scanning start point of the document. As in the case of FIG. 3A, the first carriage 110 is in the position of $x=X_{1S}$ and the second carriage 118 is in the position of $X=X_{2S}$. An optical path length $A_{S\theta}$ in this state is $A_{S\theta}=A_{1S\theta}+A_{2S\theta}+A_3+A_{4S\theta}$.

When the scanning of the document is started, the first carriage 110 starts movement in the right direction of x in the figure at the appropriate constant speed $V_1$. At this point, as in the case shown in FIGS. 3A to 3C, the second carriage 118 starts movement in a direction identical with that of the first carriage 110, i.e., the forward direction of x at speed $V_1/2$, which is a half of the moving speed $V_1$ of the first carriage 110, in accordance with the default setting state.

FIG. 4B shows positions of the respective carriages at a point when time $t_x$ has elapsed from the start of the document scanning. When the scanning start point is assumed to be a reference, the first carriage 110 and the second carriage 118 move in the forward direction of x by $V_1 \cdot t_x$ and $V_1 \cdot t_x/2$, respectively. Therefore, an optical path length $A_{2x\theta}$ of the optical path $R_1R_2$ at this point is $A_{2S\theta}+(V_1-V_1/2)\cdot t_x=A_{2S\theta}+(V_1/2)\cdot t_x$. An optical path length $A_{4x\theta}$ of the $R_3P_1$ is $A_{4S\theta}-(V_1/2)\cdot t_x$. Since there is the inclination between the original placing glass plate 122 and the moving direction x of the first carriage 110 and the second carriage 118, it is necessary to pay attention to the fact that an optical path length $A_{1x\theta}$ of an optical path $Q_{x\theta}R_1$ changes from the value $A_{1S\theta}$ at the scanning start time. $A_{1x\theta}$ is given by $A_{1S\theta}+V_1 \cdot t_x \cdot \tan\theta$. As a result, an optical path length $A_{x\theta}$ in this state is $A_{x\theta}=A_{1x\theta}+A_{2x\theta}+A_3+A_{4x\theta}=\{A_{1S\theta}+V_1\cdot t_x\cdot\tan\theta\}+\{A_{2S\theta}+(V_1/2)\cdot t_x\}+A_3+\{A_{4S\theta}-(V_1/2)\cdot t_x\}=(A_{1S\theta}+A_{2S\theta}+A_3+A_{4S\theta})+V_1\cdot t_x\cdot\tan\theta=A_{s0}+V_1\cdot t_x\cdot\tan\theta$. This is different by $V_1\cdot t_x\cdot\tan\theta$ compared with the optical path length $A_{S\theta}$ at the start point of the scanning of the document. Since a value of $\tan\theta$ is positive, this means that an optical path length from the object point Q to the principal point in object space $P_1$ of the lens 116 increases during the scanning of the document. Therefore, resolution changes during the scanning of the document.

FIG. 4C shows positions of the respective carriages at the end point of the scanning of the document. As it is evident from the explanation about FIG. 4B, an optical path length $A_{E\theta}$ changes from the optical path length $A_{S\theta}$ at the start point of the scanning of the document. Since the length of an original scannnable range in the sub-scanning direction is R and θ is positive, the optical path length $A_{E\theta}$ increases by $R\cdot\tan\theta$ compared with the optical path length $A_{S\theta}$ at the start point of the scanning of the document.

Figure 5A:
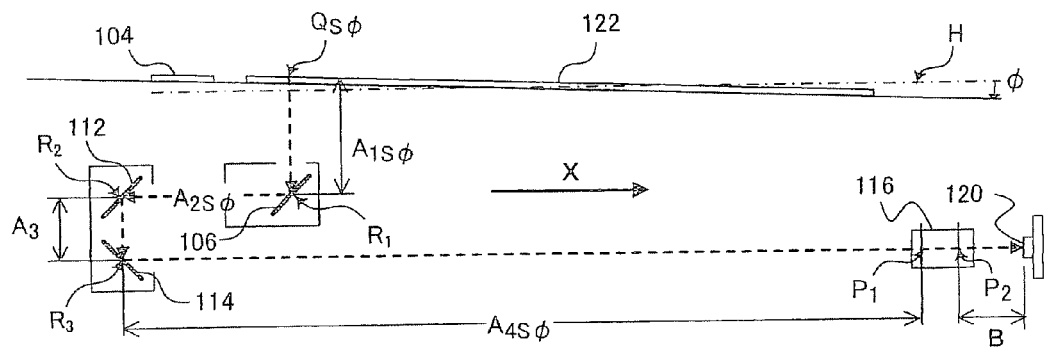
Figure 5B:
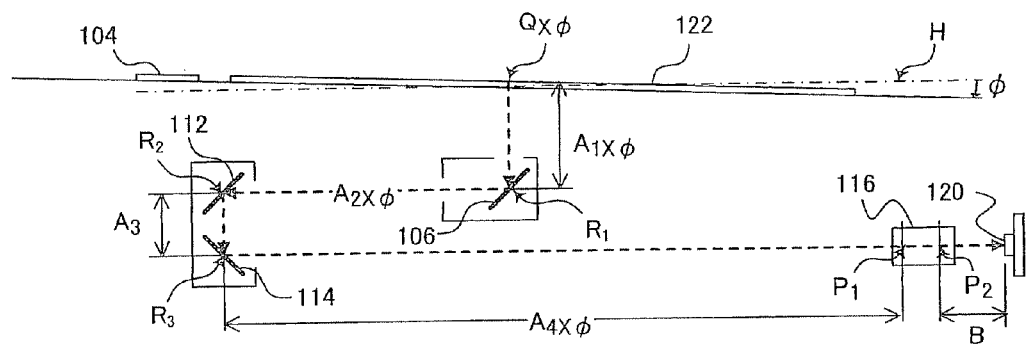
Figure 5C:
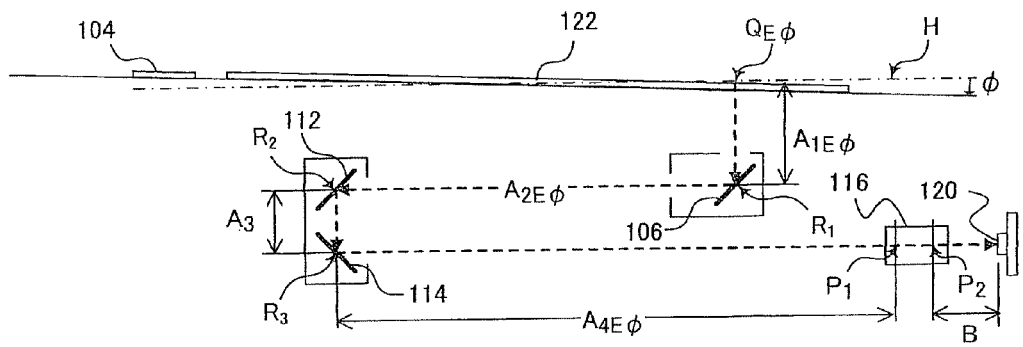

A case in which an inclination ϕ between the original placing glass plate 122 and the moving direction x of the first carriage 110 and the second carriage 118 is negative is shown in FIGS. 5A to 5C. FIG. 5A shows positions of the respective carriages at the start point of the scanning of the document. An optical path length $A_{S\phi}$ in this state is $A_{S\phi}=A_{1S\phi}+A_{2S\phi}+A_3+A_{4S\phi}$.

FIG. 5B shows positions of the respective carriages at a point when time $t_x$ has elapsed from the scanning start of the document. The optical path length $A_{x\phi}$ in this state is $A_{x\phi}=A_{S\phi}+V_1\cdot t_x\cdot\tan\phi$. This is different by $V_1\cdot t_x\cdot\tan\phi$ compared with the optical path length $A_{S\phi}$ at the start point of the scanning of the document. Since a value of $\tan\phi$ is positive, this means that an optical path length from the object point Q to the principal point in object space P1 of the lens 116 decreases during the scanning of the document. Therefore, resolution changes during the scanning of the document.

FIG. 5C shows positions of the respective carriages at the end point of the scanning of the document. As it is evident from the explanation about FIG. 5B, an optical path length $A_{E\phi}$ in this state changes from the optical path length $A_{S\phi}$ at the start point of the scanning of the document. Since the length of the original scannable range in the sub-scanning direction is R and ϕ is negative, the optical path length $A_{E\phi}$ decreases by $R\cdot\tan\phi$ compared with the optical path length $A_{S\phi}$ at the start point of the scanning of the document.

However, as mentioned already, even if the optical path length A changes during the scanning of the document, if the optical path length A satisfies $A_0-D_f<A<A_0+D_r$ during the original scanning, the predetermined resolution is obtained over the entire area of the scanning range of the document. $A_0$ is a value of A satisfying Equation (2) and is an optical path length in the case in which a most satisfactory imaging state is obtained and best resolution is obtained. $D_f$ and $D_r$ are a front depth of field and a rear depth of field, respectively.

In the present invention, first, it is checked whether resolution in the sub-scanning direction at the time of document scanning satisfies a reference. In the fixing original scanning system, when there is a scanning area of resolution not satisfying the reference, a position of the second carriage at the time of document scanning is corrected from a value of an operation conforming to a default setting state such that resolution in the sub-scanning direction in all scanning areas satisfies the reference.

Figure 6A:
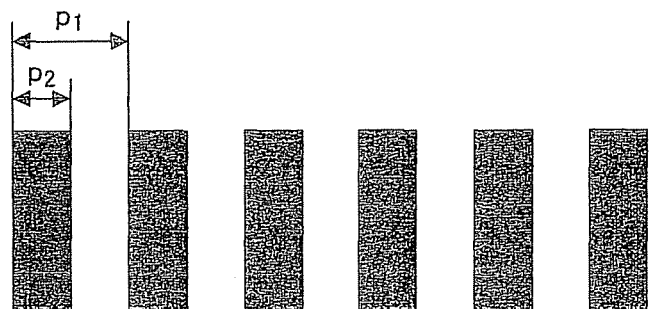
FIG. 6A is a diagram showing an example of an evaluation chart appropriate for evaluating resolution.

This will be explained in order. In the embodiment of the present invention, first, it is checked whether resolution in the sub-scanning direction at the time of document scanning satisfies a reference. For this purpose, an appropriate evaluation chart for checking resolution in the sub-scanning direction is read to calculate a value of an amplitude value of a response outputted from the optical sensor 120 when this evaluation chart is read (hereinafter referred to as "amplitude of the response outputted from the optical sensor 120"). The amplitude of the response outputted from the optical sensor 120 is closely related to resolution of the optical system. When a value of the amplitude of the response outputted from the optical sensor 120 is large, resolution is high. An example of a well-known evaluation chart for checking resolution is shown in FIG. 6A. For example, black and white stripe patterns are shown in this evaluation chart. As illustrated in FIG. 6A, stripes of the evaluation chart are drawn with a pitch $p_1$ corresponding to scanning resolution in the sub-scanning direction of the document processing apparatus. The width of black stripes is drawn as $p_2$. The evaluation chart is set on the original placing glass plate 122 such that a surface on which the stripe patterns are shown of the evaluation chart faces the original placing glass plate 122 and the sub-scanning direction as the scanning direction and the stripe patterns are orthogonal to each other.

Figure 6B:
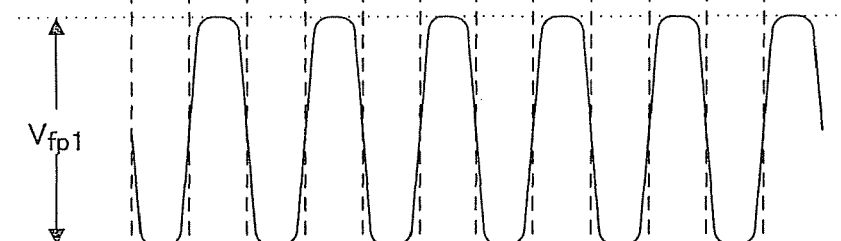
FIGS. 6B to 6D are diagrams showing examples of an optical sensor output at the time when the evaluation chart shown in FIG. 6A is read.
Figure 6C:
Figure 6D:
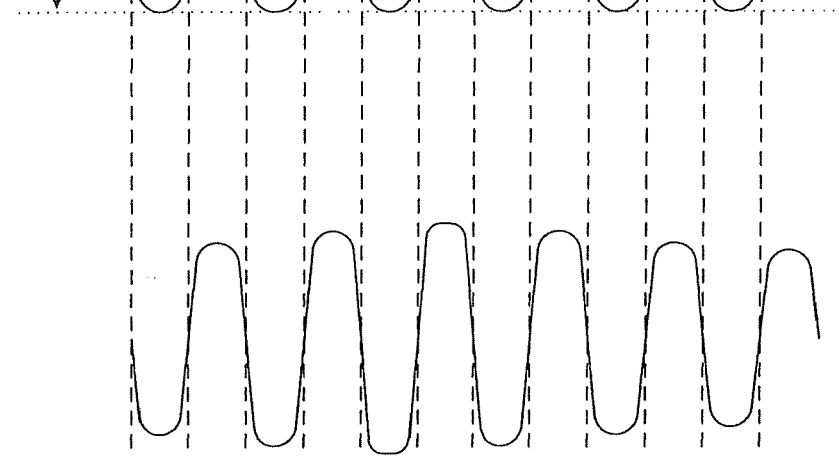

Examples of an output of the optical sensor 120 at the time when the evaluation chart is read are shown in FIGS. 6B to 6D. FIG. 6B shows an output in the case where an image of the evaluation chart is most satisfactorily imaged on the optical sensor 120, i.e., in the case of focusing. Such an output is obtained when the optical path length A described above from the object point Q to the principal point in object space $P_1$ of the lens 116 is equal to $A_0$ that satisfies Equation (2) over the entire area of the sub-scanning. In the scanning scheme for a placed original on the glass, to fix the optical path length A from the object point Q to the principal point in object space $P_1$ of the lens 116 over the entire area of the sub-scanning, as shown in FIGS. 3A to 3C, the original placing glass plate 122 and the moving direction X of the first carriage and the second carriage need to be parallel. At the time of focusing, the amplitude of the response outputted from the optical sensor 120 is maximized, a large quantity of harmonic components are included in an output waveform, and a frequency band width has a widest waveform.

FIG. 6C shows an output in the case of out-of-focus. Such an output is obtained when the optical path length A described above from the object point Q to the principal point in object space $P_1$ of the lens 116 is different from $A_0$ that satisfies Equation (2). Compared with the output shown in FIG. 6B, the amplitude is reduced, the number of harmonic components of a waveform is small, and the waveform is obtuse. The output shown in FIG. 6C is obtained when amplitude thereof is fixed and, as in the case of FIG. 6B, the optical path length A is fixed over the entire area of the sub-scanning, for example, when the original placing glass plate 122 and the moving direction X of the first carriage and the second carriage are parallel.

FIG. 6D shows an output in the case in which the original placing glass plate 122 and the moving direction X of the first carriage and the second carriage are not parallel as shown in FIGS. 4A to 4C and FIGS. 5A to 5C. In this case, the optical path length A is not fixed over the entire area of the sub-scanning but changes in accordance with scanning. Therefore, an output of the optical sensor 120 changes in accordance with scanning. The output shown in FIG. 6D has small output amplitude because, for example, a value of the optical path length A is smaller than $A_0$ near the start position of the scanning. When the scanning progresses, the value of the optical path length A approaches $A_0$ and the output amplitude increases. When the scanning further progresses, since the value of the optical path length A exceeds $A_0$, the output amplitude decreases to be small again. Conversely, an output same as the output shown in FIG. 6D is obtained in the case in which a value of the optical path length A is larger than $A_0$ near the start position of the scanning, the value of the optical path length A approaches $A_0$ when the scanning progresses, and the value of the optical path length A decreases to be smaller than $A_0$ when the scanning further progresses.

As it is evident from the above explanation, it is possible to determine a position of focusing from the amplitude or the waveform of the response outputted from the optical sensor 120. In an explanation of the embodiment below, a form for determining a position of focusing from amplitude of a response outputted from the optical sensor 120, which is relatively easily determined, will be explained.

Figure 7:
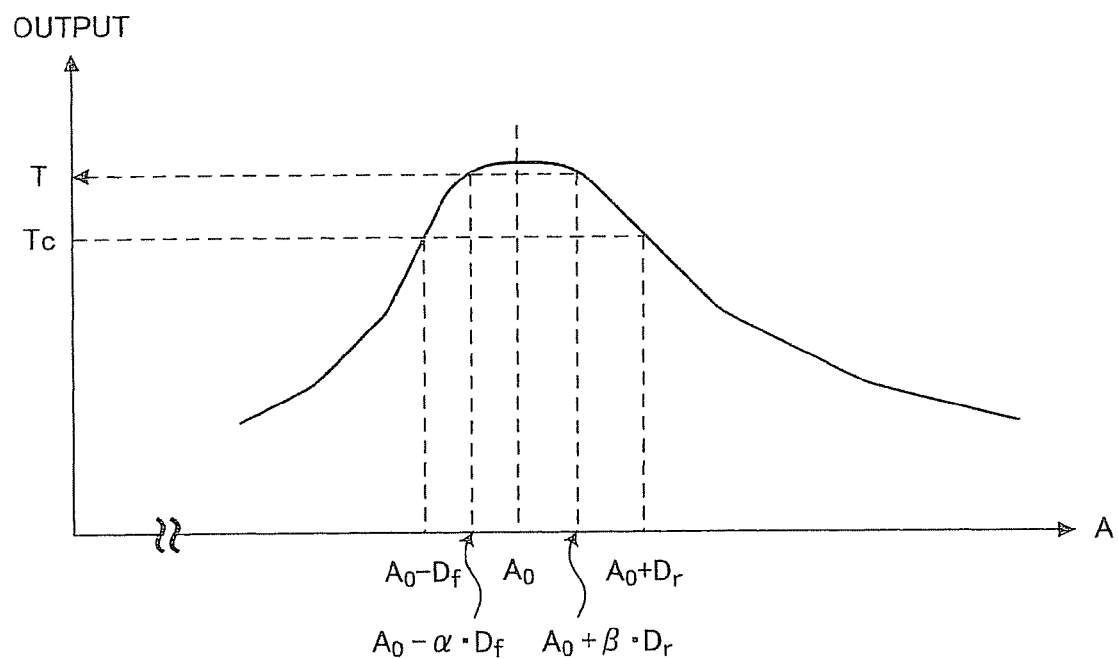
FIG. 7 is a diagram showing a relation between an amplitude value of a response outputted from the optical sensor when the evaluation chart appropriate for evaluating resolution is read and an optical path length A.

A relation between amplitude of a response outputted from the optical sensor 120 and the optical path length A is shown in FIG. 7. In an area in which a value of the optical path length A approaches $A_0$ while increasing, the amplitude of the response outputted from the optical sensor 120 increases in accordance with an increase in the optical path length A. When the value of the optical path length A is equal to $A_0$, the amplitude of the response outputted from the optical sensor 120 takes a maximum value. In an area in which the value of the optical path length A further increases exceeding $A_0$, the amplitude of the response outputted from the optical sensor 120 decreases in accordance with the increase in the optical path length A. Dependency of the amplitude of the response outputted from the optical sensor 120 on the optical path length A depends on resolution, scanning speed, a stripe pitch of an evaluation chart, and the like of an image scanning apparatus. However, when these factors are fixed, for example, as shown in FIG. 7, the dependency is decided uniquely. As described already, to obtain the predetermined resolution in the embodiment of the present invention, it is not always necessary to strictly satisfy $A=A_0$. In other words, the object point Q only has to be within a range of a so-called depth of field of the optical system. In the present invention, the depth of field means depth at which the predetermined resolution is obtained in the image scanning apparatus. A depth of field on a side on which an optical length is shorter than $A_0$ is the front depth of field $D_f$ and a depth of field on a side on which the optical path length is longer than $A_0$ is the rear depth of field $D_r$. If $A_0-D_f<A<A_0+D_r$ is satisfied in the optical path length A, the predetermined resolution is obtained. If a value of the optical path length A is present in an area from $A_0-D_f$ to $A_0+D_r$ in FIG. 7, the predetermined resolution is obtained and an amplitude value of the response outputted from the optical sensor 120 is larger than $T_c$ shown in the figure. In general, $D_f<D_r$.

An embodiment of a method of calculating a moving distance C to be corrected of a position of the second carriage 118 in order to obtain the predetermined resolution when the predetermined resolution in the sub-scanning direction is not obtained in the scanning scheme for a placed original on the glass will be explained. First, the evaluation chart is set on the original placing glass plate 122 such that the surface on which the stripe patterns are shown of the evaluation chart faces the original placing glass plate 122 and the sub-scanning direction as the scanning direction and the stripe patterns are orthogonal to each other. Subsequently, amplitude of a response outputted from the optical sensor 120 is measured in plural positions in the sub-scanning direction. The positions in the sub-scanning direction where the amplitude of the response outputted from the optical sensor 120 is measured may be positions decided in advance, may be decided, after the amplitude of the response outputted from the optical sensor 120 is measured over the entire area in the sub-scanning direction, in, for example, positions where a value of the amplitude of the response outputted from the optical sensor 120 is small in particular, or may be other positions. In the following explanation, a case in which positions in the sub-scanning directions where the amplitude of the response outputted from the optical sensor 120 is measured are predetermined positions decided in advance will be described. However, the present invention is not limited to this case. At a stage when the amplitude of the response outputted from the optical sensor 120 in the predetermined positions in the sub-scanning direction is measured, scanning in the sub-scanning direction is executed in an operation conforming to the default setting condition. The first carriage 110 and the second carriage 118 start movement from default scanning start positions, respectively. The second carriage 118 moves in a direction identical with a direction of the first carriage 110, i.e., the forward direction of x shown in FIG. 1A at speed $V_1/2$, which is a half of the moving speed $V_1$ of the first carriage 110. Therefore, a moving distance from the scanning start position of the second carriage 118 is a half of a moving distance from the scanning start position of the first carriage 110. A position of the first carriage 110 during the scanning is a position where an original is scanned.

A value of the amplitude of the response outputted from the optical sensor 120 is measured in plural positions in the sub-scanning direction to calculate the moving distance C to be corrected of a position of the second carriage 118 for obtaining the predetermined resolution. Since these processing methods are the same regardless of positions, in the following explanation, a processing method for measuring the amplitude of the response outputted from the optical sensor 120 in one position of the first carriage 110 and calculating the moving distance C to be corrected of the second carriage 118 for obtaining the predetermined resolution in that position will be described.

Figure 8:
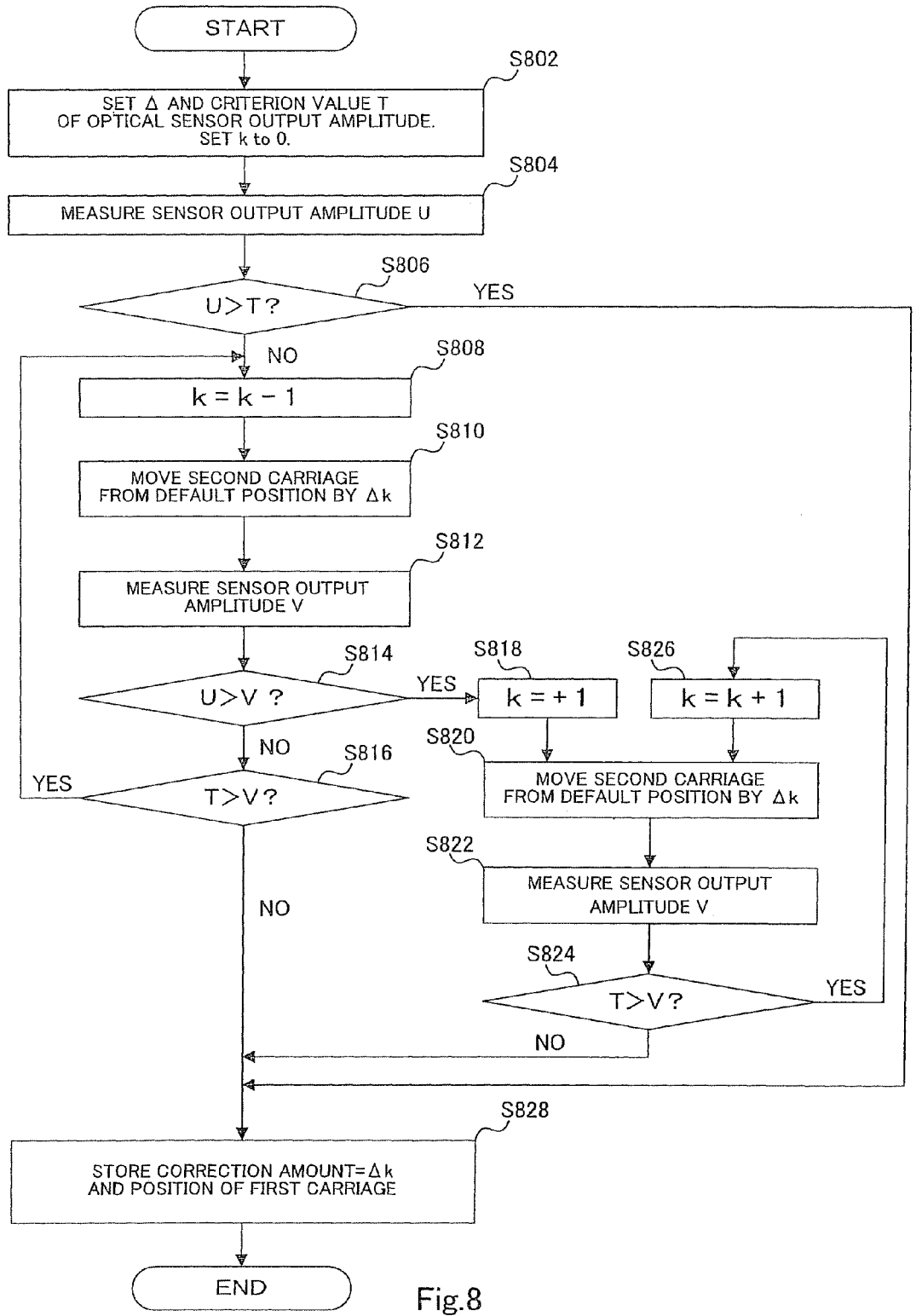
FIG. 8 is a flowchart showing an example of an operation for calculating a moving distance C to be corrected of a position of a second carriage for obtaining predetermined resolution in a predetermined scanning position according to the embodiment of the present invention in an scanning scheme for a placed original on the glass.

An example of an operation for measuring the amplitude of the response outputted from the optical sensor 120 in a predetermined scanning position and calculating the moving distance C to be corrected of the position of the second carriage for obtaining the predetermined resolution in that position is shown in FIG. 8. First, in S802, a criterion value T of the amplitude of the response outputted from the optical sensor 120 necessary for obtaining the predetermined resolution is set. To obtain the predetermined resolution, a criterion value of the amplitude of the response outputted from the optical sensor 120 only has to be set to be equal to or larger than $T_c$ shown in FIG. 7. In this embodiment, for example, as shown in FIG. 7, an amplitude value of the response outputted from the optical sensor 120 at the optical path length A of $A_0-\alpha \cdot D_f$ is set as the criterion value T. Here, $0<\alpha<1$. As shown in FIG. 7, at the optical path length A of $A_0+\beta \cdot D_r$, a value of the amplitude of the response outputted from the optical sensor 120 is also T. Here, $0<\beta<1$. When the criterion value T is set in this way, amplitude of the response outputted from the optical sensor 120 equal to or larger than the criterion value T is obtained when the optical path length A is in a range of $A_0-\alpha \cdot D_f \leq A \leq A_0+\beta \cdot D_r$. In other words, a full width of the optical path length A at which the amplitude of the response outputted from the optical sensor 120 equal to or larger than the criterion value T is obtained is $\alpha \cdot D_f+\beta \cdot D_r$. In S802, in a process of the processing for calculating the moving distance C to be corrected of the position of the second carriage a unit moving distance $\Delta$ for moving the position of the second carriage is set. A parameter k indicating the number of correction steps used in the processing for calculating the moving distance C to be corrected of the position of the second carriage is set to zero.

Subsequently, in S804, a value of the amplitude of the response outputted from the optical sensor 120 in a predetermined scanning position is measured. To measure a value of the amplitude of the response outputted from the optical sensor 120 in the scanning position, the first carriage 110 and the second carriage 118 are moved in an action conforming to the default setting state. When positions of the first carriage 110 and the second carriage 118 are represented by $x_1$ and $x_2$, respectively, $x_1$ and $x_2$ in the scanning position are given by $x_1=X_{1S}+X_1$ and $x_2=X_{2S}+X_2$. Here, $X_{1S}$ and $X_{2S}$ are scanning start positions of the first carriage 110 and the second carriage 118, respectively. $X_1$ and $X_2$ represent moving distances from the scanning start positions in the predetermined scanning position of the first carriage 110 and the second carriage 118, respectively. In the operation conforming to the default setting state, the second carriage 118 moves at speed a half of speed of the first carriage 110. Thus, $X_2=X_1/2$. In this operation conforming to the default setting state, an amplitude value of the response outputted from the optical sensor 120 is read and a read value is set as U.

In S806, the amplitude value U of the response outputted from the optical sensor 120 read in S804 and the criterion value T set in S802 are compared. When the amplitude value U of the response outputted from the optical sensor 120 in the operation conforming to the default setting state is smaller than the criterion value T, the processing shifts to a process for calculating the moving distance C to be corrected of the position of the second carriage for obtaining the predetermined resolution that starts from S808.

In S808, first, the parameter k is decremented by 1. Since $k=0$, $K=-1$ at this stage. In S810, while keeping the position of the first carriage 110, the second carriage 118 is moved from the position of the default setting state by $\Delta \cdot k$. At this stage, since $k=-1$, $\Delta \cdot k=-\Delta$. In other words, the second carriage 118 is moved from the position of the default setting state a predetermined distance $\Delta$ in a direction away from the first carriage 110. According to this processing, the position $x_2$ of the second carriage 118 is $x_2=X_{2S}+X_2-\Delta$. As it is evident from the explanation above, the movement of the second carriage 118 is equal to both the optical path length $A_2$ between $R_1$ and $R_2$ and the optical path length $A_4$ between $R_3$ and $P_1$ shown in, for example, FIG. 1B and affects the optical lengths in an additive manner. Therefore, the optical path length A from the object point Q to the principal point in object space $P_1$ of the lens 116 changes by a distance twice as large as the moving distance of the second carriage. In S810, the second carriage 118 is moved from the position of the default setting state by the predetermined distance $\Delta$ in the direction away from the first carriage 110. Thus, the optical path length A increases from the value of the default setting state by $2 \cdot \Delta$.

It is necessary to set the movement unit $\Delta$ in adjusting the position of the second carriage to a proper value. This is because, when a value of $\Delta$ is too large, the process for calculating the moving distance C to be corrected of the position of the second carriage may not be concluded, and, conversely, when a value of $\Delta$ is too small, conclusion of the process for calculating the moving distance C, with which the position of the second carriage should be corrected, takes long. In this embodiment, as described above, the full width of the optical path length A at which the amplitude of the response outputted from the optical sensor 120 equal to the criterion value T set in S802 is obtained is $\alpha \cdot D_f+\beta \cdot D_r$. According to the movement of the second carriage 118, since the optical path length A changes by a distance twice as large as the moving distance of the second carriage, $\Delta$ only has to be set to a value in a range that satisfies $0<\Delta\square(\alpha \cdot D_f+\beta \cdot D_r)/2$. Taking into account the fact that $\beta \cdot D_r>\alpha \cdot D_f$, for example, it is also possible to set a value of $\Delta$ to $\alpha \cdot D_f$.

After the second carriage 118 is moved from the position of the default setting by $\Delta \cdot k$ in S810, an amplitude value V of a response outputted from the optical sensor 120 in this state is measured (S812). In S814, the amplitude value V of the response outputted from the optical sensor 120 and the amplitude value U of the response outputted from the optical sensor 120 measured in the default setting state are compared. When the amplitude value U of the response outputted from the optical sensor 120 measured in the default setting state is small compared with the amplitude value V of the response outputted from the optical sensor 120, this means that, since the second carriage 118 is moved by the predetermined distance Δ in the direction away from the first carriage 110 in S812, the amplitude of the response outputted from the optical sensor 120 is improved. In this case, the processing proceeds to S816 and the amplitude value V of the response outputted from the optical sensor 120 and the criterion value T are compared. When the criterion value T is larger than the amplitude value V of the response outputted from the optical sensor 120, this means that the amplitude value of the response outputted from the optical sensor 120 has not reached the criterion value T. The processing returns to S808.

In S808, the parameter k is decremented by 1 again. Since k=−1, k=−2 at this stage. In S810, while keeping the position of the first carriage 110, the second carriage 118 is moved from the position of the default setting state by 2·Δ in the direction away from the first carriage 110. According to this processing, the position $x_2$ of the second carriage 118 is $x_2=X_{2S}+X_2-2\cdot\Delta$. The optical path length A takes a value increased by 4·Δ compared with the value of the default setting state. In S812 and the subsequent steps, processing same as the processing described earlier is performed.

The processing from S808 to S816 is repeated several times. When it is determined in S816 that the criterion value T is smaller than the amplitude value V of the response outputted from the optical sensor 120, this means that the amplitude of the response outputted from the optical sensor 120 reaches a value more excellent than the criterion value T. In this case, the processing proceeds to S828. A distance Δ·k to be corrected of the position of the second carriage is calculated. This distance and the position of the first carriage are stored in the memory 210 and the processing for one position of the first carriage 110 is finished.

In S814 at a stage in the middle of the processing from S808 to S816, when the amplitude value U of the response outputted from the optical sensor 120 measured in the default setting state is large compared with the amplitude value V of the response outputted from the optical sensor 120 measured anew, the processing proceeds to S818. This is because the fact that the amplitude value U of the response outputted from the optical sensor 120 measured in the default setting state is large compared with the amplitude value V of the response outputted from the optical sensor 120 means that the amplitude of the response outputted from the optical sensor 120 is not improved even by moving the second carriage 118 by the predetermined distance Δ in the direction apart from the first carriage 110. In S818, the parameter k is set to +1 to change the moving direction of the second carriage 118 to a direction opposite to that in the processing performed.

In S820, while keeping the position of the first carriage 110 in the default setting state, the second carriage 118 is moved from the position of the default setting state by Δ·k. At this stage, since k=1, Δ·k=Δ. In other words, the second carriage 118 is moved from the position of the default setting state by the distance Δ in a direction toward the first carriage 110. By moving the second carriage 118 from the position of the default setting state by the predetermined distance Δ in the direction toward the first carriage 110, the optical path length A decreases from the value of the default setting state by 2·Δ.

The amplitude value V of the response outputted from the optical sensor 120 in this state is measured (S822). The processing proceeds to S824. In S824, the amplitude value V of the response outputted from the optical sensor 120 and the criterion value T are compared. When the criterion value T is larger than the amplitude value V of the response outputted from the optical sensor 120, this means that the amplitude value V has not reached a sufficient amplitude value of a response outputted from the optical sensor 120 yet. The processing shifts to S826. In S826, the parameter k is incremented by 1. Since k=1, k=2 at this stage. In S820, while keeping the position of the first carriage 110 in the default setting state, the second carriage 118 is moved from the position of the default setting state by 2·Δ in the direction toward the first carriage 110. According to this processing, the position $x_2$ of the second carriage 118 is $x_2=X_{2S}+X_2+2\cdot\Delta$. The optical path length A takes a value reduced by 4·Δ compared with the value of the default setting state. After this, processing same as the processing from S822 to S824 described earlier is performed.

The processing in S826, S820, S822, and S824 is repeated several times. When it is determined in S824 that the criterion value T is smaller than the amplitude value V of the response outputted from the optical sensor 120, this means that the amplitude of the response outputted from the optical sensor 120 has reached a value more excellent than the criterion value T. The processing proceeds to S828. In S828, a distance Δ·k, with which the position of the second carriage should be corrected, is calculated. This distance and the position of the first carriage are stored in the memory 210. The processing for one position of the first carriage 110 is finished.

When it is determined in S806 that the amplitude value U of the response outputted from the optical sensor 120 is larger than the criterion value T, this means that the predetermined resolution is obtained in the default setting state. The processing proceeds to S828. A distance Δ·k to be corrected of the position of the second carriage is calculated. This distance to be corrected and the first carriage position are stored. The processing for one position of the first carriage 110 is finished. In this case, since k=0, it is unnecessary to correct the distance at all.

In FIG. 8, k is decremented in S808, set as k=+1 in S818, and incremented in S826. However, opposite processing is also possible. In other words, it is evident that k may be incremented in S808, set as k=−1 in S818, and decremented in S826.

The processing operations for measuring an amplitude of response outputted from the optical sensor 120 in predetermined one position in the sub-scanning direction and calculating the moving distance C to be corrected of the position of the second carriage for obtaining the predetermined resolution in the position have been described with reference to FIG. 8. To calculate the moving distance C to be corrected of the position of the second carriage for obtaining the predetermined resolution in plural positions in the sub-scanning direction, the first carriage is set to a different position and processing same as the processing explained above only has to be performed. According to these processing operations, in the plural positions in the sub-scanning direction, the moving distance C to be corrected is calculated from the position in the default setting state of the second carriage.

When the position of the second carriage is moved, according to the moving distance C to be corrected, from the position in the default setting state of the second carriage calculated for a certain position in the sub-scanning direction, a value of the optical path length A in the position in the sub-scanning direction is corrected by a distance (−2) times as large as the moving distance of the second carriage. In this embodiment, the optical path length A corrected in this way satisfies $A_0-\alpha\cdot D_r \leq A < A_0+\beta\cdot D_r$. This is because, in S802, the criterion value T is selected as the value described above. Therefore, by moving the position of the second carriage by the moving distance C to be corrected from the position in the default setting state of the second carriage calculated for a certain position in the sub-scanning direction, for the position, predetermined amplitude of a response outputted from the optical sensor 120 is obtained and predetermined resolution is obtained. However, it should be noted that best amplitude or resolution of the response outputted from the optical sensor 120 is not obtained.

In other words, by moving the position of the second carriage by the moving distance C to be corrected from the position in the default setting state of the second carriage calculated for a certain position in the sub-scanning direction, the optical path length A is corrected to a value equal to or larger than $A_0-\alpha \cdot D_f$ and equal to or smaller than $A_0+\beta \cdot D_r$, but is not corrected to a best value $A_0$. Therefore, a value of the optical path length A may be $A_0-\alpha \cdot D_f$ or may be $A_0+\beta \cdot D_r$, according to the correction of the position of the second carriage. In this case, in a worst case, when the value of the optical path length A decreases by $(1-\alpha) \cdot D_f$ or increases by $(1-\beta) \cdot D_r$, an object point deviates from the area of the depth of field, a value of the amplitude of the response outputted from the optical sensor 120 shown in FIG. 7 is smaller than Tc, and the predetermined resolution is not satisfied.

It is necessary to pay attention to the fact that the moving distance C to be corrected of the position of the second carriage calculated is the value in the default setting state. In other words, the moving distance C to be corrected of the position of the second carriage calculated is a value in the case in which the position of the second carriage is not corrected at all from the default setting state in all the states in which the operation for scanning the document is performed. Therefore, if the position of the second carriage is once corrected by a certain value from the default setting state in a certain position of the first carriage, in a position ahead of the position of the first carriage, a moving distance to be corrected of the position of the second carriage changes by the value corrected.

The processing operation for calculating the moving distance C to be corrected of the position of the second carriage for obtaining the predetermined resolution while changing the position by the fixed step Δ has been explained with reference to FIG. 8. However, as known by those having ordinary skill in the art, the method of calculating the moving distance C to be corrected of the position of the second carriage to obtain the predetermined resolution is not limited to the method shown in FIG. 8. For example, it is evident that it is possible to apply a hill-climbing algorithm and the like to the present invention.

A processing operation in the scanning scheme for a placed original on the glass after calculating the moving distance C to be corrected of the position of the second carriage for obtaining the predetermined resolution will be explained. Although there are various embodiments of this processing operation, a relatively simple embodiment will be explained to clarify the gist of the present invention. However, the present invention is not limited to the embodiment to be explained.

Figure 9A:
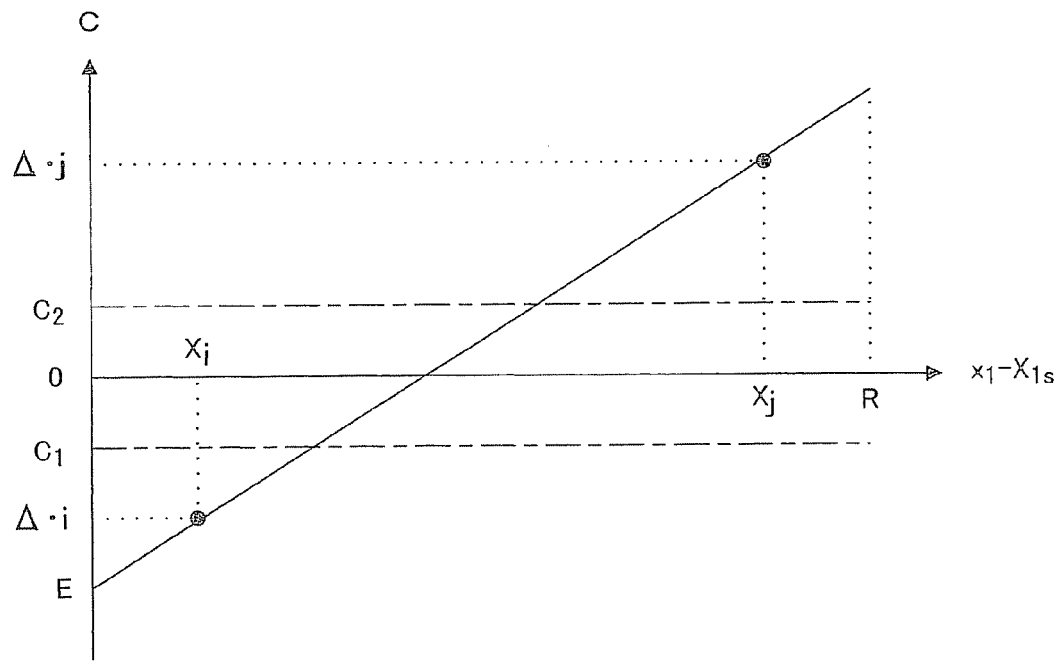
FIG. 9A is an example representing a relation between a moving distance to be corrected of a position of a second carriage and a scanning position, in which it is estimated that the predetermined resolution is obtained over an entire image scanning area according to the embodiment of the present invention in the scanning scheme for a placed original on the glass.

The moving distance C to be corrected of the position of the second carriage for obtaining the predetermined resolution is calculated in positions in two places in the moving range of the first carriage 110, i.e., $x_1=X_{1S}+X_i$ and $x_1=X_{1S}+X_j$. It is assumed that values obtained as a result of the calculation are Δ·i and Δ·j. When linear approximation is performed over an entire image scanning area from the distances to be corrected at the two points, a straight line shown in FIG. 9A is obtained. In the figure, i indicates a case of a negative value and j indicates a case of a positive value. As it is evident from the figure, an inclination m of the straight line is $\Delta \cdot (j-i)/(X_j-X_i)$ and means an inclination of a distance to be corrected of the position of the second carriage with respect to a moving distance from the scanning start point of the first carriage. A value E of the distance to be corrected of the position of the second carriage at the time when $x_1-X_{1S}=0$ is $-\Delta \cdot (jX_i-iX_j)/(X_j-X_i)$.

Figure 9B:
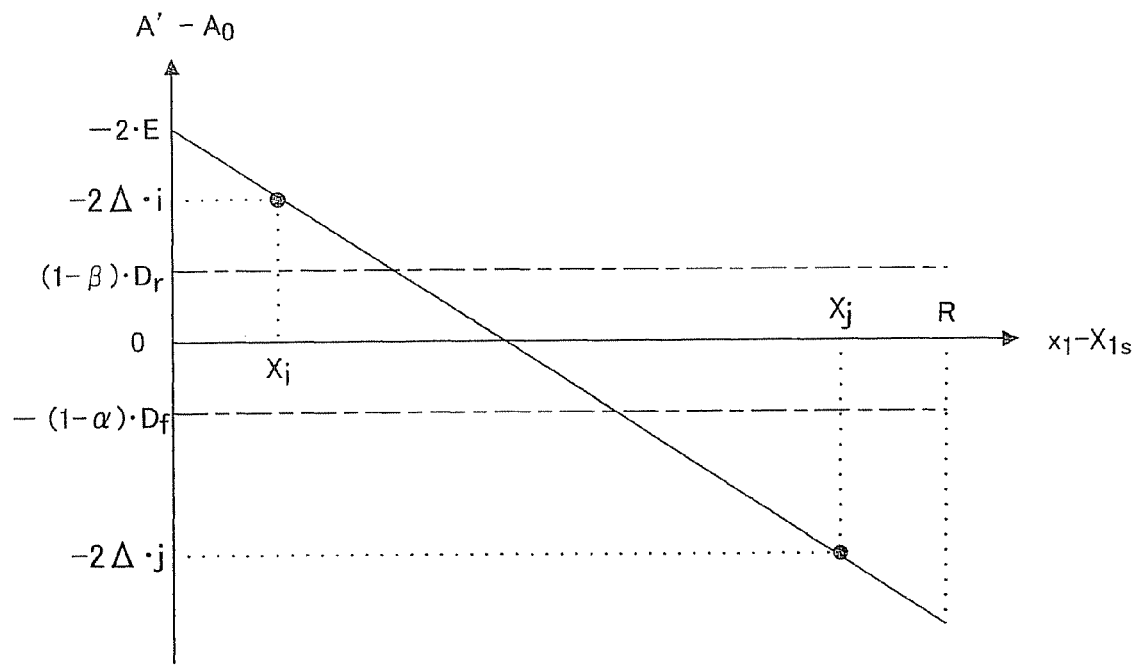
FIG. 9B is a diagram showing an example of dependency of a value concerning an optical path length, which is estimated according to the embodiment of the present invention, on a scanning position in the scanning scheme for a placed original on the glass.

It is possible to estimate a value of a difference $(A-A_0)$ between the optical path lengths A and $A_0$ in the default setting state from the moving distances C to be corrected of the position of the second carriage for obtaining the predetermined resolution calculated in the positions of the two places of the first carriage 110. However, as described above, the processing operation explained with reference to FIG. 8 is a processing operation for calculating the moving distance C to be corrected from the position in the default setting state in the second carriage for correcting the optical path length A to a value equal to or larger than $A_0-\alpha \cdot D_f$ and equal to or smaller than $A_0+\beta \cdot D_r$. In other words, the processing operation is not a processing operation for calculating the moving distance C to be corrected from the position in the default setting state of the second carriage for accurately correcting the optical path length A to $A_0$ without an error. Therefore, the value $(A-A_0)$ concerning the optical path length estimated from the moving distances C to be corrected of the position of the second carriage for obtaining the predetermined resolution calculated in the positions of the two places of the first carriage 110 involves uncertainties of $+\beta \cdot D_r$ and $-\alpha \cdot D_f$. Since there are such uncertainties, a value concerning the optical path length is represented as $(A'-A_0)$ to distinguish the value from the value $(A-A_0)$ concerning the optical path length estimated from the moving distances C to be corrected of the position of the second carriage. An example of estimation of dependency of the value $(A'-A_0)$ concerning the optical path length on a moving distance $(x_1-X_{1S})$ from the scanning start position of the first carriage 110 is shown in FIG. 9B. As it is evident from the above description, the value $(A'-A_0)$ concerning the optical path length is a value obtained by multiplying the moving distance C to be corrected of the position of the second carriage by (−2). Therefore, an inclination of a straight line representing the value $(A'-A_0)$ concerning the optical path length shown in FIG. 9B is $(-2 \cdot m)=-2 \cdot \Delta \cdot (j-i)/(X_j-X_i)$. The value $(A'-A_0)$ concerning the optical path length at the time when $x_1-X_{1S}=0$ is $(-2 \cdot E)=2 \cdot \Delta \cdot (j \cdot X_i-i \cdot X_j)/(X_j-X_i)$.

As described above, when the value $(A'-A_0)$ concerning the optical path length satisfies $-D_f < A-A_0 < D_r$, the predetermined resolution is obtained. However, the value $(A'-A_0)$ concerning the optical path length involves uncertainties of $+\beta \cdot D_r$ and $-\alpha \cdot D_f$. Therefore, considering most steadily taking into account the uncertainties, it is reasonable to estimate that the value $(A'-A_0)$ concerning the optical path length, with which the predetermined resolution is obtained, is a value that satisfies $-(1-\alpha) \cdot D_f < A'-A_0 < (1-\beta) \cdot D_r$. A straight line indicating $(A'-A_0)=-(1-\alpha) \cdot D_f$ and $(A'-A_0)=(1-\beta) \cdot D_r$, which indicate examples of a tolerance limit of the value $(A'-A_0)$ concerning the optical path length, is graphically shown as an alternate long and short dash line in FIG. 9B. Here, the value $(A'-A_0)$ concerning the optical path length is a value obtained by multiplying the moving distance C to be corrected of the position of the second carriage by (−2) Thus, to prevent the predetermined resolution from being not obtained, the position of the second carriage is corrected such that a value of the moving distance C to be corrected of the position of the second carriage is within a range from $C_1=-(1-\beta) \cdot D_r/2$ to $C_2=(1-\alpha) \cdot D_f/2$.

However, considering most steadily and taking into account a history of processing until a correction distance Δ·k is finally calculated in FIG. 8, it is possible to estimate that the range from $C_1$ to $C_2$ is in whatever range of an area in which the correction distance Δ·k calculated is equal to or larger than the criterion value T. Therefore, it is also possible to estimate a margin of the correction distance Δ·k calculated.

A first embodiment of a processing operation after calculating the moving destination C to be corrected of a position of the second carriage 118 for obtaining the predetermined resolution will be explained. In this embodiment, correction of the position of the second carriage 118 is started immediately before the first carriage 110 reaches a scanning position where it is estimated that the predetermined resolution is not obtained. The correction of the position of the second carriage 118 is finished at timing when the first carriage 110 reaches the scanning position where it is estimated that the predetermine resolution is not obtained. While the first carriage 110 is moving in other positions, the second carriage 118 performs an operation conforming to the default setting state, i.e., moves in a direction identical with a direction of the first carriage 110 at uniform speed $V_1/2$, which is a half of the speed $V_1$ of the first carriage 110. In other words, the second carriage 118 usually moves in the direction identical with the direction of the first carriage 110 at uniform speed $V_1/2$, which is a half of the speed $V_1$ of the first carriage 110 and performs correction of the position of the second carriage 118 stepwise every moment immediately before the first carriage 110 reaches the scanning position where it is estimated that the predetermined resolution is not obtained.

An operation of the second carriage in the first embodiment will be explained with reference to a flowchart in FIG. 10. The second carriage operates on the basis of a parameter related to correction from the default position of the second carriage. First, a parameter $CL_0$ calculated in advance from the distance C to be corrected of the second carriage, which is $C_1$ and $C_2$ defining a limit where it is possible to obtain the predetermined resolution, and a value of the inclination m is read out (S1002). Here, $CL_0=(C_2-C_1)/m$, which means a moving distance of the first carriage corresponding to a maximum interval for correcting the position of the second carriage. The position of the second carriage may be corrected at every moving distance of the first carriage, which is a value smaller than $CL_0$. In S1002, a value of a distance $X_{max}$ to an end of document scanning automatically detected or designated by a user is also read.

In S1004, processing for correcting the position of the second carriage in the scanning start position, i.e., when the respective carriages start movement is performed. A value $C_0$ represented by the distance C to be corrected of the position of the second carriage after performing this correction processing is stored. When the predetermined resolution is obtained in a state in which two carriages in the scanning start position of the default setting state stay in that position, this processing is not always necessary. However, in a state in which the predetermined resolution is not obtained, this processing is indispensable. An operation of the processing in this scanning start position will be explained with reference to FIG. 11.

Figure 11:
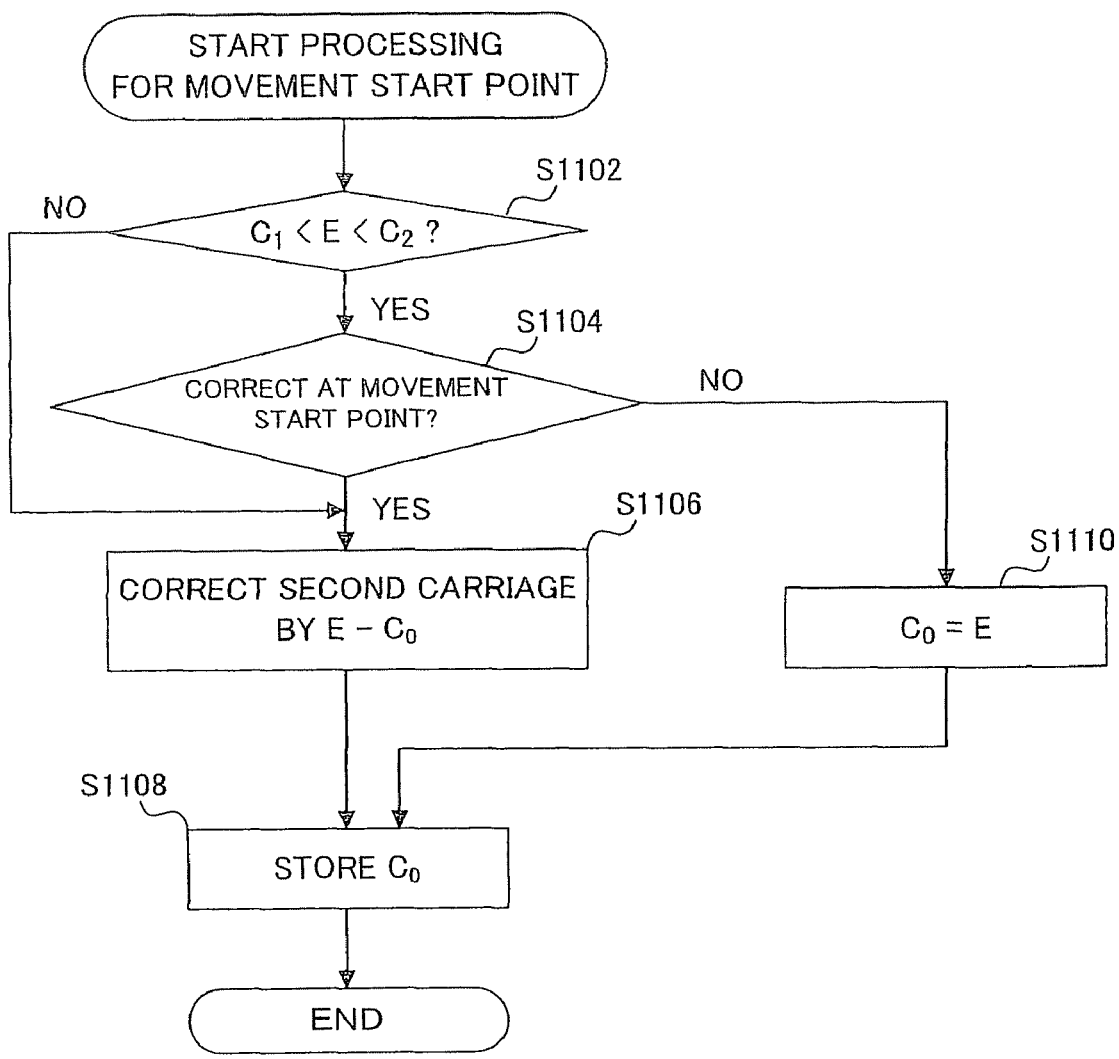
FIG. 11 is a flowchart for explaining a processing operation in a scanning start position of the position of the second carriage in the scanning scheme for a placed original on the glass according to the embodiment of the present invention.

In a flowchart shown in FIG. 11, first, in S1102, it is determined whether a value E of the distance to be corrected of the second carriage at the time when the scanning start position, i.e., the position $x_1$ of the first carriage is $X_{1S}$ is in a range in which it is possible to obtain the predetermined resolution, i.e., $C_1<E<C_2$ is satisfied. When this relation is satisfied, the processing proceeds to S1104 and it is determined whether correction of the position of the second carriage is performed at the movement start point. When it is determined in S1104 that the correction of the position of the second carriage is performed at the movement start point or when a value of E is not within a predetermined range in S1102, the processing proceeds to S1106. In S1106, processing for correcting the position of the second carriage to a value $C_0$ of the distance to be corrected of the second carriage that satisfies $C_1<C_0<C_2$ is performed. In other words, the position of the second carriage is moved by $E-C_0$. As a result of the processing, the value of the distance to be corrected of the second carriage at the movement start point is corrected to $C_0$. Here, it is evident that $C_0$ may be set as $C_0=0$. In S1108, the value of $C_0$ is stored and the processing concerning the position of the second carriage at the movement start point is finished. On the other hand, when the E satisfies the relation $C_1<E<C_2$ but it is determined in S1104 that the correction of the position of the second carriage is not performed at the movement start point, the value of the distance to be corrected of the second carriage does not change from E and $C_0$ is set as $C_0=E$ (S1110) Subsequently, the processing proceeds to S1108, the value of $C_0$ is stored, and the processing concerning the position of the second carriage at the movement start point is finished.

Figure 10:
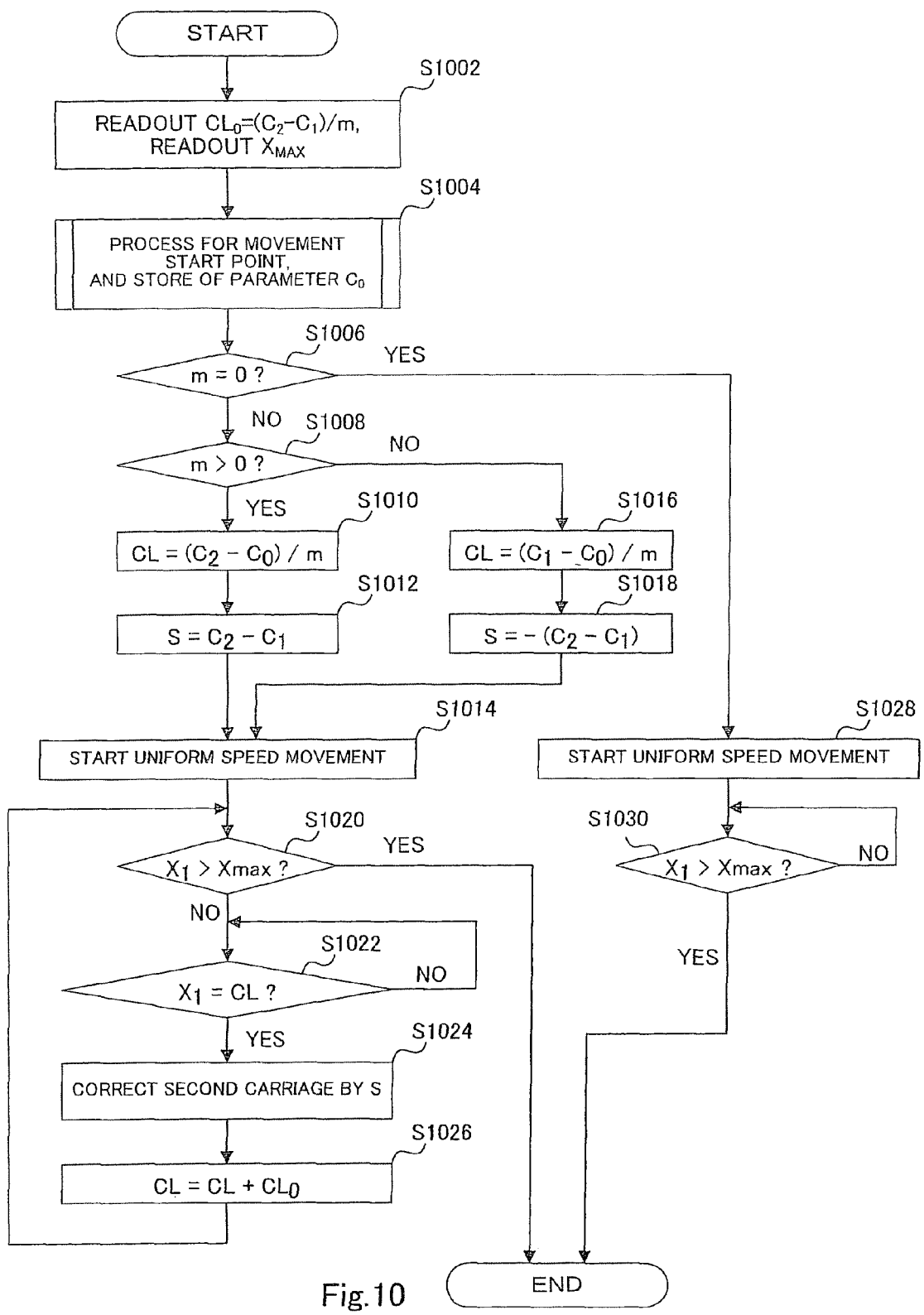
FIG. 10 is a flowchart for explaining an example of an operation for processing the position of the second carriage in the scanning scheme for a placed original on the glass according to the embodiment of the present invention.

As described above, when the correction of the second carriage in the movement start position and the storage of the parameter $C_0$ are performed in S1004, the processing proceeds to S1006 shown in FIG. 10. In S1006, it is determined whether the inclination m of the straight line representing the relation between the moving distance C to be corrected of the second carriage and the position of the first carriage shown in FIG. 9A is 0. When m is not 0, the processing proceeds to S1008. In S1008, it is determined whether m is positive or negative. When m is positive, the processing proceeds to S1010. In S1010, a maximum value CL of a moving distance of the first carriage at the time when the position of the second carriage is corrected first after the document scanning is started and the two carriages start movement is calculated with reference to $C_0$ stored in S1004 and stored. When m is positive, $CL=(C_2-C_0)/m$. Subsequently, in S1012, a correction distance S at the time when the correction of the position of the second carriage is performed in the following processing is calculated and stored. When m is positive, for example, $S=C_2-C_1$. There is a degree of freedom in setting of a value of S. The value $C_2-C_1$ shown as an example is a maximum value.

After calculating various parameters according to the processing described above, in S1014, the two carriages start movement simultaneously. The moving speed $V_2$ of the second carriage is constant speed that is a half of the moving speed $V_1$ of the first carriage, i.e., $V_1/2$. When the movement of the two carriages is started, monitoring of a moving distance $X_1$ from the scanning start position of the first carriage is started and comparison of a value of this $X_1$ and a value of the position $X_{max}$ at the end of the document scanning is performed in S1020. The monitoring of the value of $X_1$ is performed by, for example, monitoring a first carriage driving signal generated by the first carriage-driving control unit 202. When the driving source included in the first carriage driving unit 206 is a pulse motor, since the first carriage driving signal is a pulse string, it is possible to monitor $X_1$ and learn a value of $X_1$ by counting the number of pulses of this pulse string. When the value of $X_1$ exceeds the value of the position $X_{max}$ at the end of the document scanning, this means that the document scanning is finished. Thus, the processing is finished.

When the value of X1 is equal to or smaller than the position Xmax of the end of the document scanning, the processing proceeds to S1022. In S1022, the value of $X_1$ and the maximum value CL of the moving distance of the first carriage at the time when the position of the second carriage is corrected first after starting the movement stored in S1010 are compared. When the value of $X_1$ has not reached CL, the processing in S1022 is repeated. When the carriages further move forward and the value of $X_1$ is equal to CL, the processing shifts to S1024. In a state in which the value of $X_1$ is equal to CL, the distance to be corrected of the position of the second carriage has reached $C_2$. In S1024, the position of the second carriage is corrected by S stored in S1012. According to this correction, the distance to be corrected of the position of the second carriage changes from $C_2$ to $C_1$. The distance C to be corrected of the position of the second carriage does not exceed the range in which the predetermined resolution is obtained.

The processing proceeds to S1026 and, after setting for increasing the value of CL by $CL_0$ calculated in S1002 is performed, the processing returns to S1020. The processing from S1020 to S1026 is repeated until it is determined in S1020 that the value of $X_1$ has reached the value of the position Xmax of the end of the document scanning. When it is determined in S1020 that the value of $X_1$ has reached the value of the position Xmax at the end of the document scanning, the series of processing is finished as described above.

Figure 12:
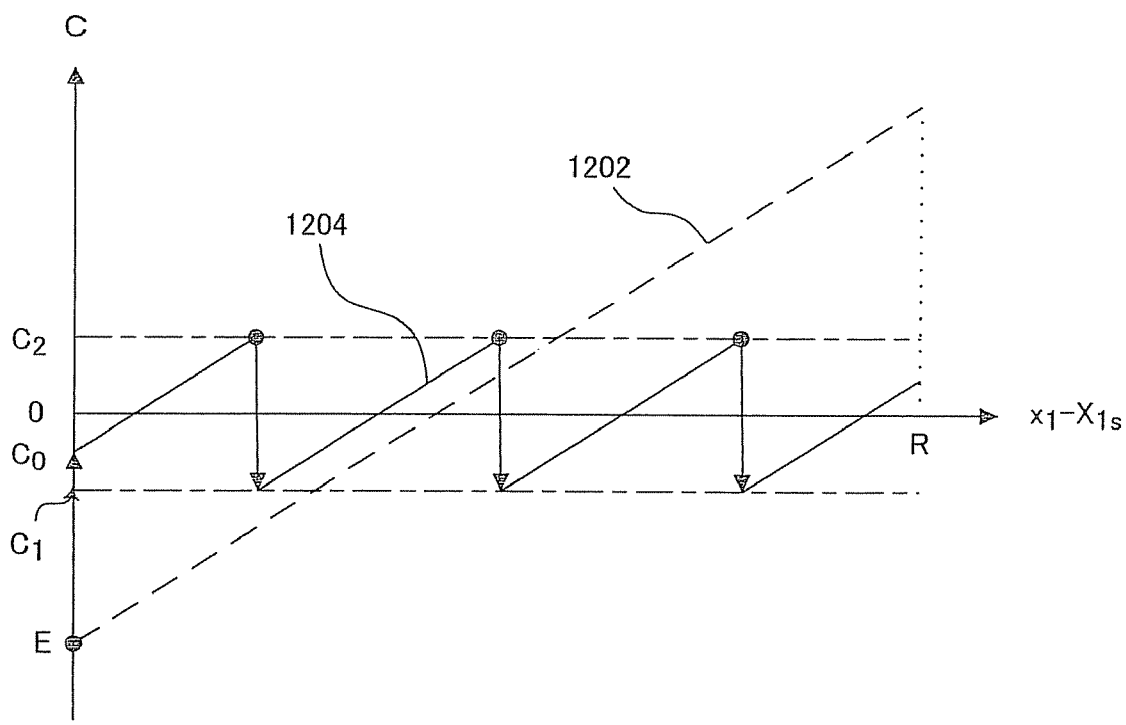
FIG. 12 is a diagram showing an example of dependency of a distance C to be corrected of a position of a second carriage on a scanning position at the time when the processing shown in FIG. 10 and the processing shown in FIG. 11 are performed in the scanning scheme for a placed original on the glass according to the embodiment of the present invention.

A state in which the distance C to be corrected of the position of the second carriage changes according to the processing described above is shown in FIG. 12. In the figure, a wavy line 1202 indicates a relation between the distance C to be corrected of the position of the second carriage and the distance from the movement start point of the first carriage calculated earlier. A solid line 1204 indicates a relation between the distance C to be corrected of the position of the second carriage and the distance from the movement start point of the first carriage explained with reference to FIGS. 10 and 11 in the first embodiment. The relation between the distance C to be corrected of the position of the second carriage and the distance from the movement start point of the first carriage in the default setting state represented by the wavy line 1202 changes to the relation between the distance C to be corrected of the position of the second carriage and the distance from the movement start point of the first carriage, shown in the solid line 1204 according to the correction of the position of the second carriage. In the movement start point, i.e., $X_1=x_1-X_{1S}=0$, the distance to be corrected of the position of the second carriage is corrected from E to $C_0$ according to the processing in S1106. When the movement of the carriages is started, the distance C to be corrected of the position of the second carriage linearly increases. When the $X_1$ from the movement start point of the first carriage reaches CL calculated in S1010, the distance to be corrected of the position of the second carriage reaches $C_2$. Thus, the distance C to be corrected of the position of the second carriage is corrected to $C_1$ in S1024 by S calculated in S1012. The correction of the position of the second carriage in S1024 is performed in a short time by increasing rotation speed of the driving source of the second carriage, for example, a pulse motor, to be large compared with a value in the default state. CL calculated in S1010 is incremented by $CL_0$ to decide new CL (S1026).

Since the carriages move continuously, the distance C to be corrected of the position of the second carriage linearly increases from $C_1$ again. When the distance $X_1$ from the movement start point of the first carriage reaches the new CL incremented by $CL_0$ in S1026, the distance to be corrected of the position of the second carriage reaches $C_2$ again. Therefore, the distance C to be corrected of the position of the second carriage is corrected again in S1024 and changes to $C_1$. Thereafter, the distance C changes in the same manner until $X_1$ reaches $X_{max}$.

Bringing the explanation back to S1008, an operation at the time when it is determined in S1008 that m is negative will described. A basic operation is the same as the operation in the case in which m is positive. However, the operation is different from the operation in the case in which m is positive in that parameters used for the processing are different. When it is determined in S1008 that m is negative, the processing proceeds to S1016. In S1016, a maximum value CL of a moving distance of the first carriage at the time when the position of the second carriage is corrected first after the document scanning is started and the two carriages start movement is calculated with reference to $C_0$ stored in S1004 and stored. When m is negative, $CL=(C_1-C_0)/m$. Subsequently, in S1018, a correction distance S at the time when the correction of the position of the second carriage is performed in processing after this is calculated and stored. When m is negative, for example, $S=-(C_2-C_1)$. There is a degree of freedom in setting of a value of S as in the case in which m is positive. The value $-(C_2-C_1)$ shown as an example is a maximum value in an absolute value. After calculating various parameters according to the processing described above, in S1014, the two carriages start movement simultaneously. The moving speed $V_2$ of the second carriage and the moving speed $V_1$ of the first carriage are identical with those in the case in which m is positive. Simultaneously with the start of movement of the second carriage, the first carriage starts movement at constant speed $V_1$ as in the case in which m is positive.

When the movement of the two carriages is started, the processing shifts to the processing in S1020 and the subsequent steps. The processing from S1020 to S1026 is the same as that in the case in which m is positive. However, one of differences from the case in which m is positive is that a value of the maximum value CL of the moving distance of the first carriage at the time when the position of the second carriage is corrected first after starting movement is the value stored in S1016, used as a criterion in the determination in S1022. Another difference from the case in which m is positive is that the distance S for correcting the position of the second carriage in S1024 is the value stored in S1018. The distance to be corrected of the position of the second carriage changes to $C_2$ according to this correction.

The operation at the time when the inclination m of the straight line representing the relation between the moving distance C to be corrected of the second carriage and the position of the first carriage is not 0 in S1006 has been explained. When it is determined in S1006 that m is 0, in S1028, the two carriages start movement. In this case, the second carriage moves at constant speed of a half of the moving speed $V_1$ of the first carriage, i.e., $V_1/2$. In this case, the first carriage starts movement at constant speed $V_1$ simultaneously with the start of movement of the second carriage. When the movement of the two carriages is started, in S1030, the moving distance $X_1$ from the scanning start position of the first carriage is monitored and a value of $X_1$ and a value of the position Xmax of the end of the document scanning are compared. It is possible to perform monitoring of the value of X1 in the same manner as the case in which m is not 0. When the value of $X_1$ is equal to or smaller than the value of the position Xmax of the end of the document scanning, the processing returns to S1030 and the processing in S1030 is repeated. When the value of $X_1$ exceeds the value of the position Xmax of the end of the document scanning, this means that the document scanning is finished. Thus, the processing is finished. As it is evident from the above explanation, when m is 0, after the scanning of the document is started, correction of the position of the second carriage is not performed. M is 0 because the moving distance C to be corrected of the position of the second carriage does not change after the carriages start movement.

As it is evident for those having ordinary skill in the art, the calculation of parameters performed before the carriages start movement in S1014 or S1028 does not need to be performed every time the document is scanned. The parameters only have to be once calculated and stored.

The operations of the second carriage in the first embodiment have been explained with reference to FIG. 10. Here, a supplementary explanation is performed. The explanation is about processing for correcting the position of the second carriage after the two carriages start movement in S1014. Actually, it is impossible to instantaneously perform the processing for correcting the position of the second carriage in S1024. In other words, to correct the position of the second carriage, time for correction decided by maximum driving speed of the driving systems for the carriages and a correction distance is at least necessary. In the above explanation, to facilitate understanding of the gist of the present invention, a simplified explanation is performed in which time for correction is neglected. Accurately, it is necessary to take into account time $_T$ required for the correction. First, a point that is T before the point $(CL)/V_1$ when the moving distance $X_1$ from the movement start position of the first carriage reaches CL is detected or a position where $X_1$ reaches $(CL)-V_1 \cdot_T$ is detected. When this detection is performed, at the same time, correction for moving the position of the second carriage is started. When $X_1$ reaches (CL), the correction processing is completed. The processing in S1022 and S1024 is accurately represented in this way.

As it is evident from the above explanation, the parameters related to the correction of the second carriage from the default position necessary in this embodiment are m, $C_1$, $C_2$, and $C_0$. $CL_0$ is also included, although $CL_0$ can be calculated from values of these parameters.

Operations of the second carriage in a second embodiment will be explained. FIG. 9A is referred to again. This figure indicates a relation between the distance C of the second carriage to be corrected from the position in the case in which the two carriages move at uniform speed and the moving distance $x_1-X_{1S}$ from the scanning start position of the first carriage. The inclination m of the straight line shown in the figure means $\Delta C/\Delta(x_1-X_{1S})$. When time after the carriages start movement is t, since $x_1-X_{1S}=V_1 \cdot t$, $m=\Delta C/(V_1 \cdot \Delta t)$. Here, a meaning of $\Delta C/\Delta t$ is nothing but a value with which the speed of the second carriage should be corrected from the value $V_2$ in the default setting state. When speed to be corrected of the second carriage is $\Delta V_2$, $\Delta V_2=\Delta C/\Delta t=m \cdot V_1$. Therefore, if correction for adding $\Delta V_2$ to the moving speed $V_2=V_1/2$ of the second carriage in the default setting state is performed, there is possibility that it is possible to obtain the predetermined resolution even if the second carriage is moved at uniform speed of $(V_2+\Delta V_2)$. Here, $\Delta V_2$ may be a negative value.

The correction method described above is a so-called particular solution. General operations of the second carriage according to the second embodiment will be explained with reference to a flowchart shown in FIG. 13. First, in S1302, the distance C to be corrected of the second carriage, which is $C_1$ and $C_2$ defining a limit where it is possible to obtain the predetermined resolution, an original scannable range R in the sub-scanning direction, and a value of $X_{max}$ are read out. In S1302, a value of the distance $X_{max}$ to the end of the document scanning automatically detected or designated by the user is also read. The value of $X_{max}$ is smaller than or equal to a value of R.

In S1304, processing for correcting the position of the second carriage in the scanning start position, i.e., at the time when the respective carriages start movement is performed. A value $C_0$ represented by the distance C to be corrected of the position of the second carriage after performing this correction processing is stored. The processing in S1304 is the same as the processing in S1004 in FIG. 10. Details of the processing are as explained already with reference to FIG. 11.

Figure 14:
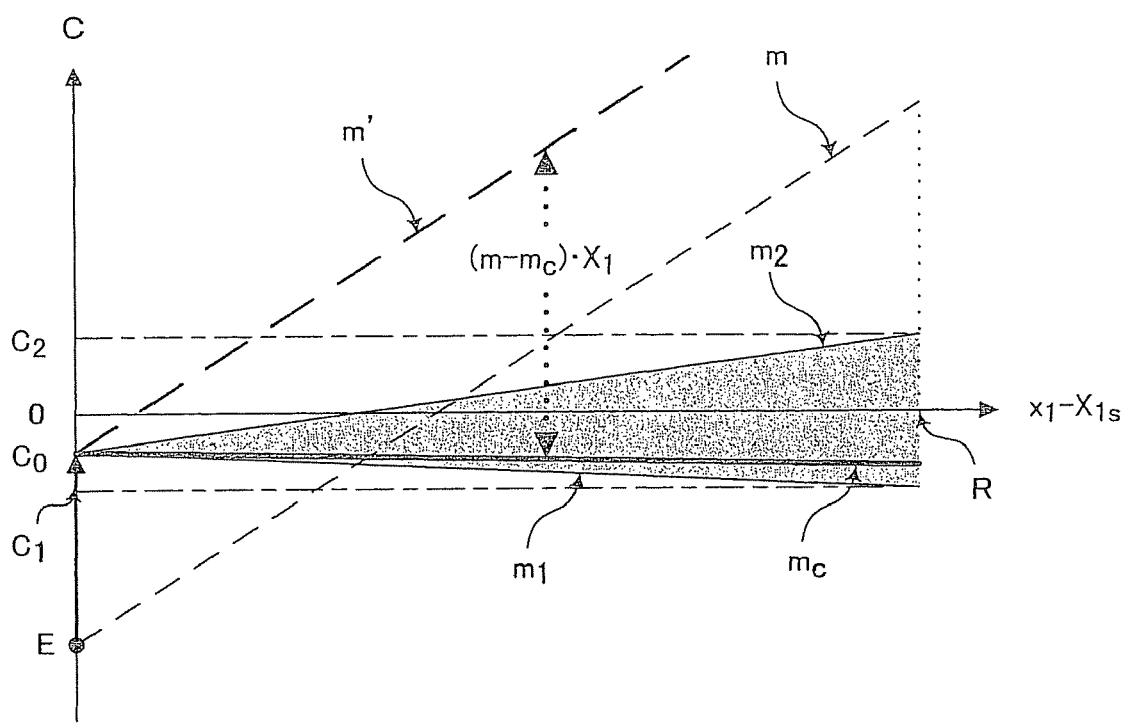
FIG. 14 is a diagram showing an example of dependency of the distance C to be corrected of a position of a second carriage on the scanning position at the time when the processing shown in FIG. 13 is performed in the scanning scheme for a placed original on the glass according to the embodiment of the present invention.

Subsequently, in S1306, a value of $m_1=(C_1-C_0)/R$ and a value of $m_2=(C_2-C_0)/R$ are calculated using $C_1$ and $C_2$ and the original scannable range R in the sub-scanning direction read in S1302 and the value of $C_0$ stored in S1304. Meaning of the values of $m_1$ and $m_2$ will be explained using FIG. 14 later. In S1308, $m_c$ that is a value equal to or larger than $m_1$ and equal to or smaller than $m_2$ is selected. Points on a straight line passing $C_0$ and having an inclination $m_c$ that is the value equal to or larger than $m_1$ and equal to or smaller than $m_2$ are within a range of the distance to be corrected of the position of the second carriage in which the predetermined resolution is obtained over the entire range of the original scannable range $X_1=R$ from the scanning start position $X_1=0$. Therefore, correction of the position of the second carriage with which points on the straight line passing $C_0$ and having the inclination m are placed on the straight line passing $C_0$ and having the inclination $m_c$ only has to be performed. Taking into account the fact that this correction distance is $(m-m_c) \cdot X_1$ and $X_1=V_1 \cdot t$, if the moving speed of the second carriage is corrected to the moving speed $V_1/2$ in the default setting state by $(m-m_c) \cdot V_1$, the predetermined resolution is obtained over the entire range of the original scanning range $X_1=R$ from the scanning start position $X_1=0$.

Therefore, in S1310, a value of the moving speed $V_2$ of the second carriage is calculated from a relational expression $V_1/2+(m-m_c) \cdot V_1$ and a result of the calculation is stored and set. When $m_c=0$, a value of $V_2$ to be set as the moving speed of the second carriage is $V_1/2+m \cdot V_1$, which coincides with the particular solution described above.

According to the processing described above, when movement is started, correction of the position of the second carriage is performed, a value of the moving speed $V_2$ of the second carriage is calculated, and then movement of the two carriages is started in S1312. The moving speed of the first carriage is constant at $V_1$. On the other hand, the moving speed $V_2$ of the second carriage is constant at $V_1/2+m_c \cdot V_1$ stored in S1310. However, the moving speed $V_2$ is different from a value of a half of the moving speed $V_1$ of the first carriage in the case of the first embodiment by $m_c \cdot V_1$.

When the movement of the two carriages is started, monitoring of the moving distance $X_1$ from the scanning start position of the first carriage is started. Comparison of a value of $X_1$ and a value of the position Xmax of the end of the document scanning is performed in S1314. It is possible to perform monitoring of the value of $X_1$ according to, for example, the method described above. When the value of $X_1$ is smaller than the value of the position Xmax of the end of the document scanning, the movement of the two carriages and the comparison of $X_1$ and the value of the position Xmax of the end of the document scanning are continuously performed. When the value of $X_1$ exceeds the value of the position Xmax of the end of the document scanning, this means that the document scanning is finished. Thus, the processing is finished.

Figure 13:
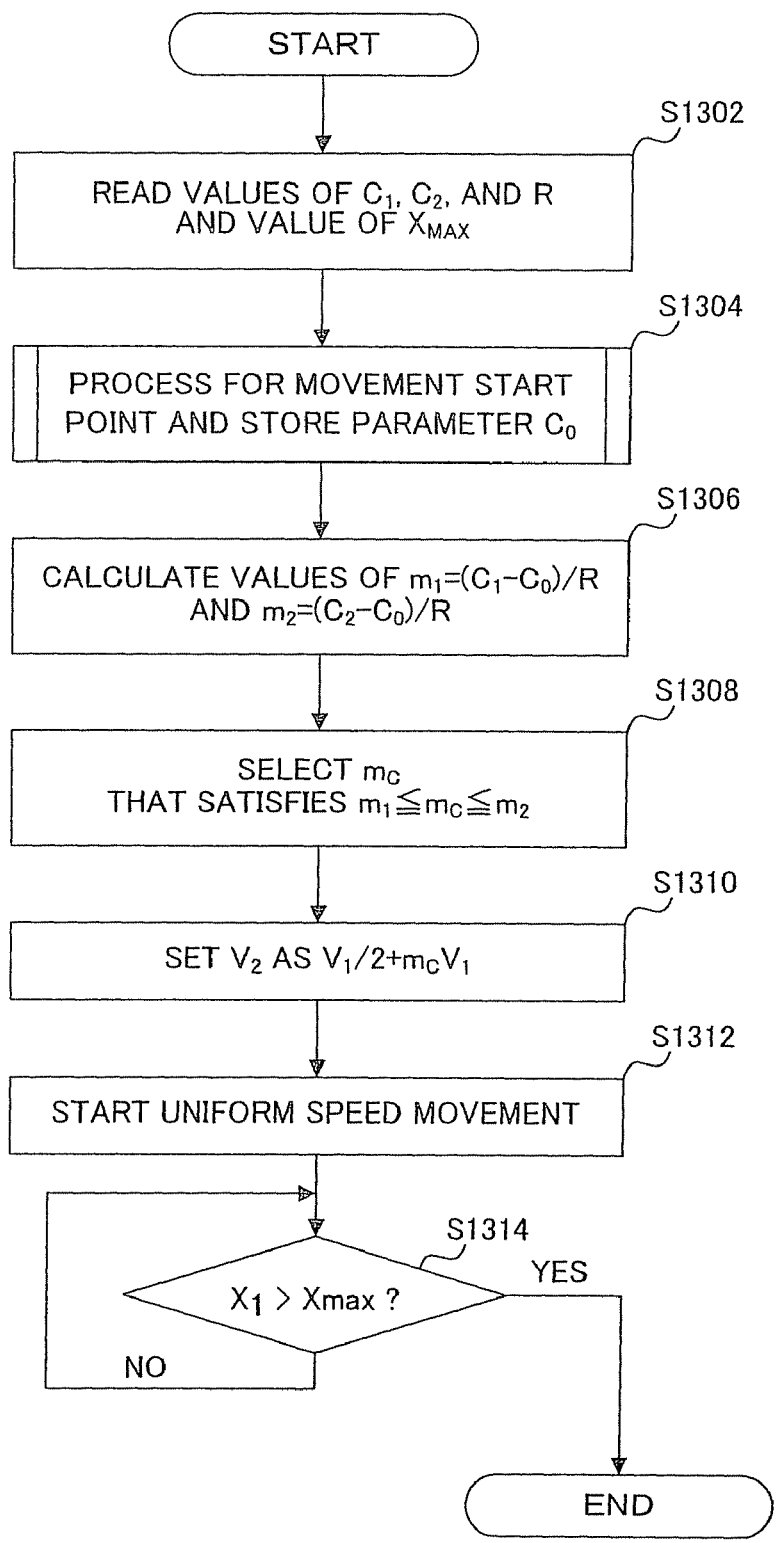
FIG. 13 is a flowchart for explaining an example of an operation for processing the position of the second carriage in the scanning scheme for a placed original on the glass according to the embodiment of the present invention.

The operations of the second carriage according to the second embodiment have been explained with reference to FIG. 13. A diagram for explaining a state in which the distance C to be corrected of the position of the second carriage changes according to the operations explained above is shown in FIG. 14. In the figure, a wavy line m represents a relation between the distance C to be corrected of the position of the second carriage in the default setting state and the distance from the movement start point of the first carriage. A wavy line m' represents a relation between the distance C to be corrected of the position of the second carriage and the distance from the movement start point of the first carriage after the distance C to be corrected of the position of the second carriage in the default state is corrected by $E_1$-$C_0$ at the movement start point. Straight lines indicated by $m_1$ and $m_2$ represent both extremes of the relation between the distance C to be corrected of the position of the second carriage and the distance from the movement start point of the first carriage as a result of performing correction of the position of the second carriage according to this embodiment when the processing for correcting the position of the second carriage is performed in the scanning start position and the distance to be corrected of the position of the second carriage is set to $C_0$. A relation between the distance C to be corrected of the position of the second carriage and the distance from the movement start point of the first carriage as a result of performing correction of the position of the second carriage according to this embodiment in which a predetermined resolution is obtained is represented by a straight line in an area between the straight lines $m_1$ and $m_2$. The straight line indicated by $m_c$ represents a relation between the distance C to be corrected of the position of the second carriage and the distance from the movement start point of the first carriage in the case in which the moving speed of the second carriage is corrected by m·$V_1$ to $V_1/2$+m·$V_1$. Moreover, the length of a dotted line with arrows at both ends thereof in the figure represents, in the distance $X_1$ from the movement start point of the first carriage, a distance to be corrected of the position of the second carriage such that the relation between the distance C to be corrected of the position of the second carriage and the distance from the movement start point of the first carriage is a straight line indicated by $m_c$. As shown in the figure, by setting the distance to be corrected of the position of the second carriage to (m−$m_c$)·$X_1$, the position of the second carriage after correcting the position is corrected from a position on the straight line indicated by m' to a position on the straight line indicated by $m_c$. As a result, the predetermined resolution is obtained in the entire range in which the first carriage moves.

The correction of scanning resolution in the scanning scheme for a placed original on the glass in which an original is fixedly set on the original placing glass plate 122 and the two carriages move to scan the original has been explained. Subsequently, correction of scanning resolution in the scanning scheme for fed original in which an original is set on a document feeder, the document feeder conveys the original, and a scanning mechanism does not move will be explained referring to the drawings as appropriate.

Figure 15A:
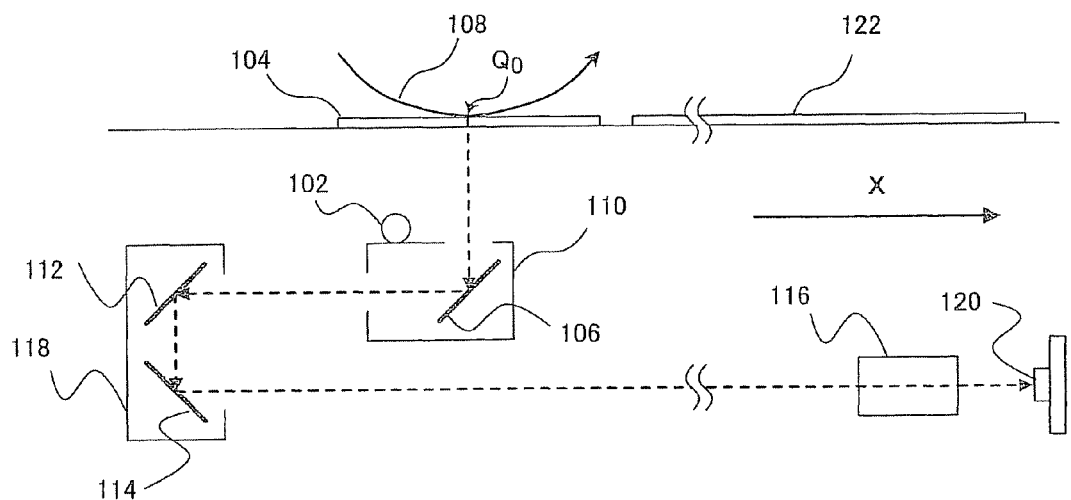
FIG. 15A is a diagram schematically showing an arrangement of an optical system in the case in which an original scanning position is normal in an scanning scheme for fed original according to an embodiment of the present invention.

FIG. 15A schematically shows an arrangement of an optical system in the case in which an original scanning position is normal in the scanning scheme for fed original. The upper surface of the through-read glass plate 104 distant from the carriages is at height substantially the same as the upper surface of the original placing glass plate 122 distant from the carriages. Usually, the optical system is arranged to scan an original when the original passes over the upper surface of the through-read glass plate 104 distant from the carriage or a position $Q_0$ extremely close to the upper surface. The original conveyed by the ADF draws a locus as indicated by the (ADF) through-read original locus 108. A position closest to the upper surface of the through-read glass plate 104 is the original scanning position $Q_0$ in the normal case on the locus 108. The original is illuminated by the light source 102 mounted on the first carriage 110 and reflected light from the position $Q_0$ of the original illuminated is guided to the lens 116 by the first mirror 106, the second mirror 112, and the third mirror 118. The lens 116 images the reflected light from the original, which is made incident thereon, on the optical sensor 120. The arrangement of the optical system in the scanning scheme for fed original is basically the same as the arrangement of the optical system in the scanning scheme for a placed original on the glass but is different from the case of the scanning scheme for a placed original on the glass in that the two carriages do not move in scanning the original.

Figure 15B:
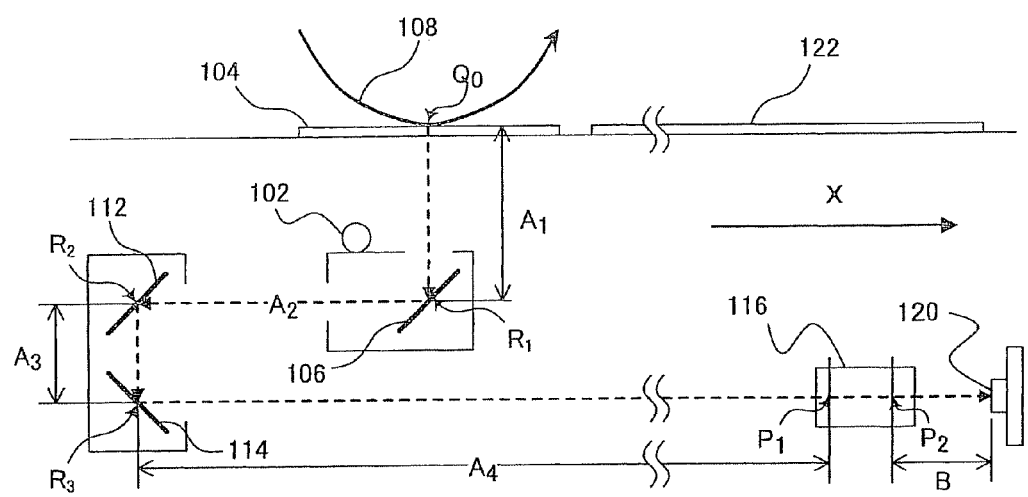
FIG. 15B is a diagram for explaining an optical path length in the optical system shown in FIG. 15A.

FIG. 15B is a diagram for explaining an optical path length in the case in which an original scanning position is normal in an optical system according to an embodiment of a document processing apparatus of the scanning scheme for fed original. As described above, the optical path length is a value obtained by integrating a product of the length of an optical path and an index of refraction of a medium, through which light progresses along the optical path, from a start point to an end point of the beam. The point $Q_0$ is a position where a document as scanning object is scanned and is optically an object point in this optical system that images an image of the document on the optical sensor.

As the document as a scanning object, usually, an original passes over the upper surface of the through-read glass plate 104 distant from the carriages or a position extremely close to the upper surface. This original is scanned on the upper surface of the through-read glass plate 104 distant from the carriages or in a position extremely close to the upper surface, i.e., the position of the point $Q_0$ in the figure. Reflected light from the point $Q_0$ is made incident on a reflection point $R_1$ on the first mirror 106. A mechanical length from the point $Q_0$ to the point $R_1$ is $L_1$. The original placing glass plate 122 is present between the point $Q_0$ and the point $R_1$. An index of refraction of the glass is about 1.5, which is different from an index of refraction 1 in the vacuum. The air or an inert gas is charged in a portion of an optical path $Q_0R_1$ other than the original placing glass plate 122. In practice, the index of refraction may be treated as 1. Therefore, when the thickness of the through-read glass plate 104 is d, an optical path length $A_1$ from the point $Q_0$ to the point $R_1$ is $A_1$=n·d+($L_1$−d)=$L_1$+(n−1)·d.

A mechanical length from the reflection point $R_1$ on the first mirror 106 to a reflection point $R_2$ on the second mirror 112 is $L_2$. An optical length $A_2$ of an optical path $R_1R_2$ is $A_2$=$L_2$. A mechanical length from the reflection point $R_2$ on the second mirror 112 to a reflection point $R_3$ on the third mirror 114 is $L_3$. An optical path length $A_3$ of an optical path $R_2R_3$ is $A_3$=$L_3$.

A mechanical length from the reflection point $R_3$ on the third mirror 114 to a principal point in object space $P_1$ of the lens 116 is $L_4$. An optical path length $A_4$ of an optical path $R_3P_1$ is $A_4$=$L_4$.

As a result, an optical path length A from the object point $Q_0$ to the lens 116 treated as a thin lens is given by Equation (1) shown below.

$$A = A_1+A_2+A_3+A_4 = L_1+L_2+L_3+L_4+(n-1)\cdot d \tag{1}$$

A mechanical length from a principal point in image space $P_2$ of the lens 116 to a photosensitive surface of the optical sensor 120 is B and an optical path length is also B.

When a focal length of the lens 116 is f, according to the basis geometrical optics, when Equation (2) below is satisfied, a document at the object point Q is accurately imaged on the photosensitive surface of the optical sensor at the magnification of B/A and best resolution is obtained.

$$1/A + 1/B = 1/f \tag{2}$$

In this embodiment, the focal length f of the lens 116 and a value of B are predetermined fixed values, respectively.

Therefore, to satisfy Equation (2), it is necessary to set the optical path length A to $A_0$, which is a value satisfying Equation (2).

However, to obtain the predetermined resolution in the embodiment of the present invention, it is not always necessary to strictly satisfy $A=A_0$. The object point Q only has to be in a range of a so-called depth of field of the optical system. When a front depth of field is $D_f$ and a rear depth of field is $D_r$, the predetermined resolution is obtained if $A_0-D_f \leq A \leq A_0+D_r$ is satisfied.

In this embodiment, thickness d and an index of refraction n of the through-read glass plate 104 and values of $A_3$ and $L_3$ are also predetermined fixed values, respectively. Eventually, to satisfy Equation (2), it is necessary to set a value of $A_1+A_2+A_4$, i.e., a value of $L_1+L_2+L_4$ to an appropriate value.

Figure 16A:
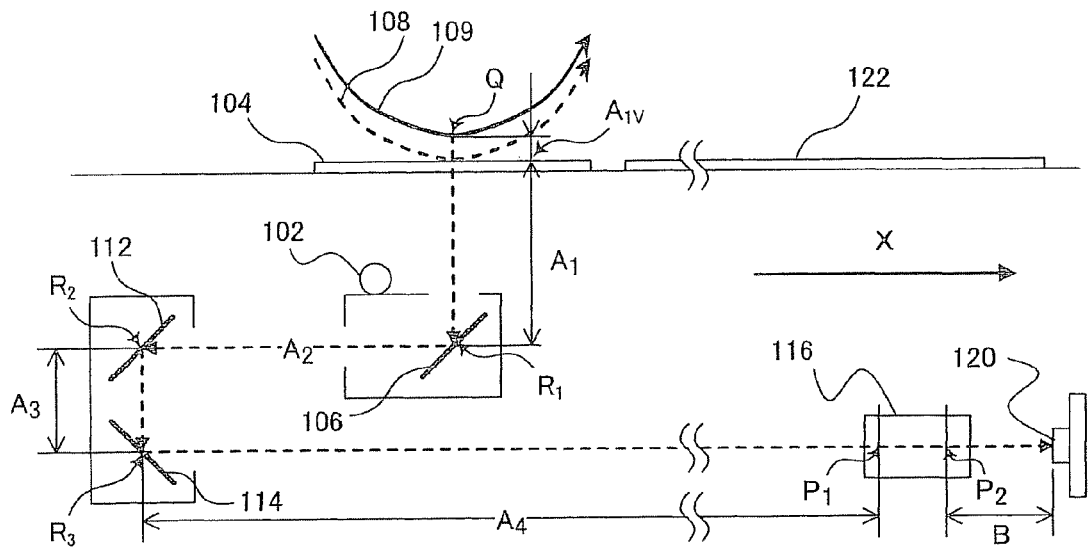
FIG. 16A is a diagram showing a state in which an ADF through-read original locus is further part from a through-read glass surface than usual in the scanning scheme for fed original according to the embodiment of the present invention.
Figure 16B:
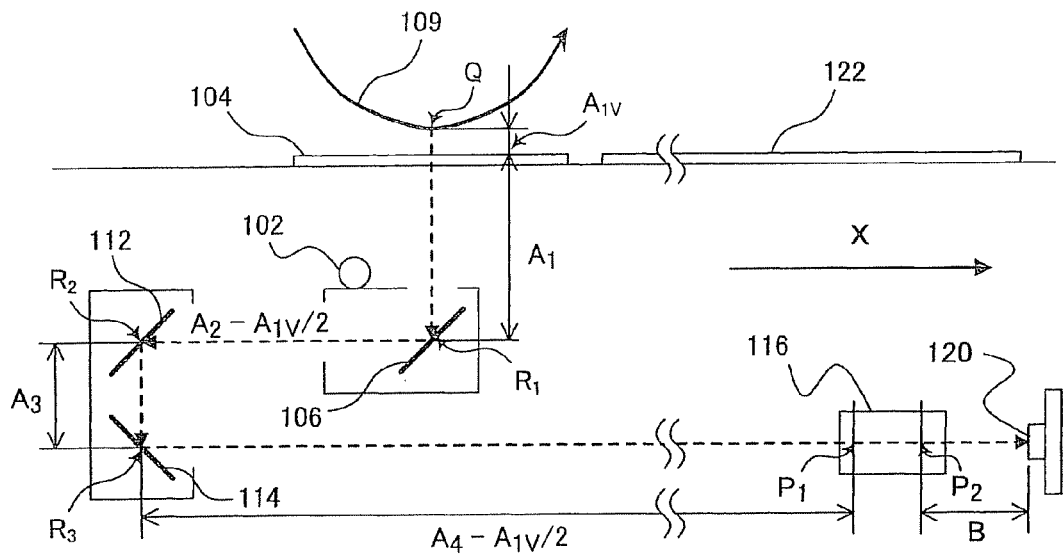
FIG. 16B is a diagram showing an optical path length for obtaining satisfactory resolution in the state shown in FIG. 16A.

If, like the ADF through-read original locus 109 indicated by a solid line, an original scanning position is further apart from the through-read glass surface by $A_{1V}$ than the ordinary ADF through-read original locus 108 indicated by a broken line as shown in FIG. 16A, the optical path length A from the original scanning position to the lens 116 increases by $A_{1V}$ compared with the case of the normal original scanning position shown in FIG. 15B. Consequently, an image of the original formed by the lens 116 may not satisfy the predetermined resolution. In such a case, to obtain the predetermine resolution, it is necessary to set the optical path length A from the original scanning position to the lens 116 in the predetermined range by adjusting lengths $A_1$ to $A_4$ that increase by $A_{1V}$. It is impossible to move the position of the first carriage because the position in the sub-scanning direction is determined. As described above, a value of $A_3$ is fixed. Therefore, the optical path lengths are adjusted only by moving the position of the second carriage. Since the optical path length A from the original scanning position to the lens 116 increases by $A_{1V}$, the increase $A_{1V}$ of the optical path lengths is offset by bringing the second carriage closer to the first carriage. When the second carriage is brought closer to the first carriage, both values of $A_2$ and $A_4$ decrease by a distance the second carriage is brought closer to the first carriage. Therefore, to offset the increase $A_{1V}$ of the optical path lengths, the second carriage only has to be brought closer to the first carriage by $A_{1V}/2$, i.e., move the second carriage in the X direction in the figure. The respective optical lengths in this case are shown in FIG. 16B.

Figure 17:
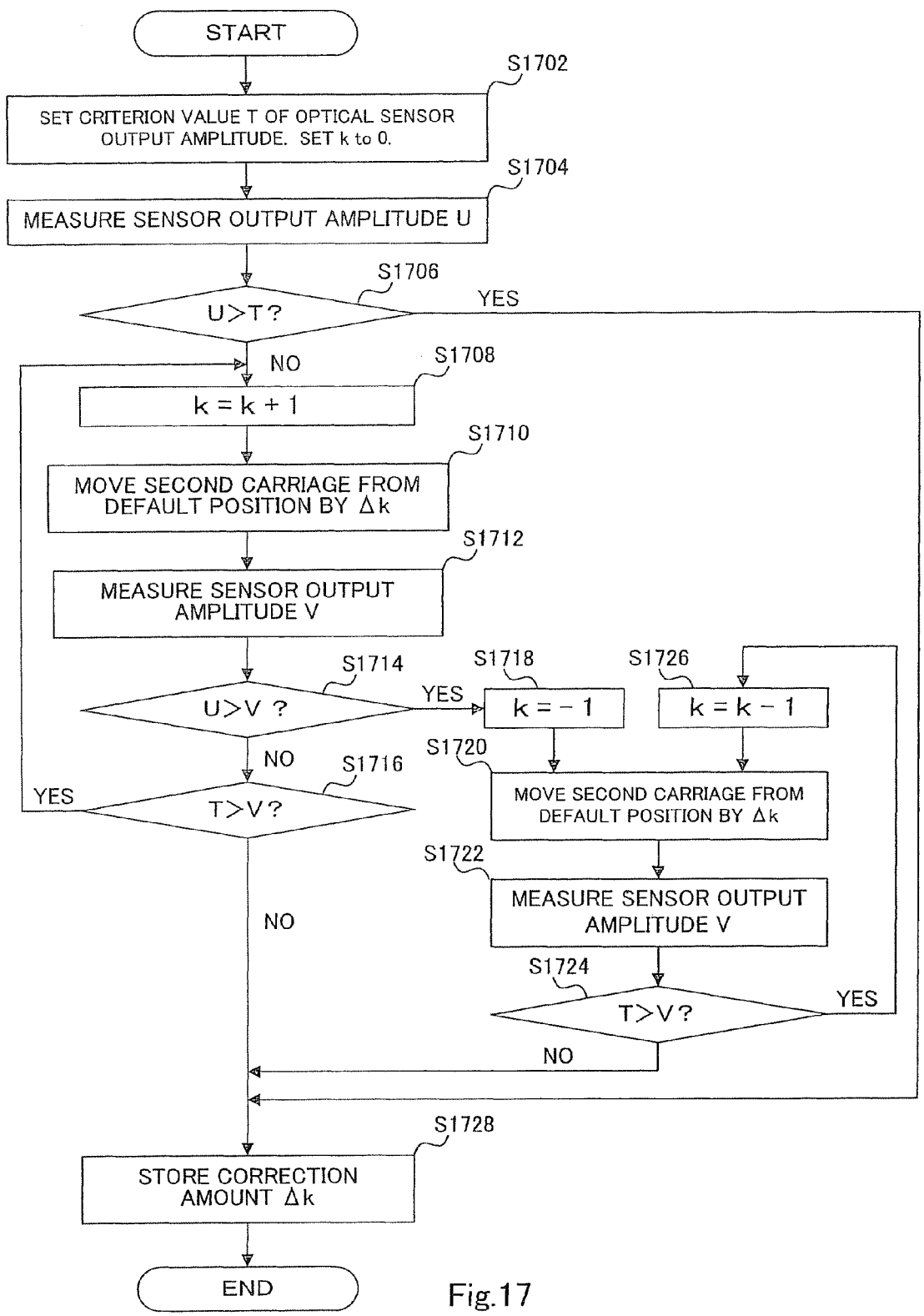
FIG. 17 is a flowchart showing an example of an operation for calculating the moving distance C to be corrected of a position of a second carriage for obtaining the predetermined resolution in the predetermined scanning position according to the embodiment of the present invention in the scanning scheme for fed original.

An example of an operation for calculating the moving distance C to be corrected of the position of the second carriage for obtaining the predetermined resolution in the scanning scheme for fed original is shown in FIG. 17. There are various implementation modes for the operation for calculating the moving distance C to be corrected of the position of the second carriage for obtaining the predetermined resolution in the scanning scheme for fed original. The operation represented by FIG. 17 is an implementation mode. Basically, the operation is the same as the operation for calculating the moving distance C to be corrected of the position of the second carriage for obtaining the predetermined resolution in the scanning scheme for a placed original on the glass explained with reference to FIG. 8. Therefore, signs, for example, k, U, and T used in operations in respective steps in FIG. 17 have the same meanings as the signs in FIG. 8. Differences from the operation in the scanning scheme for a placed original on the glass explained with reference to FIG. 8 will be hereinafter mainly explained. Operations from S1702 to S1706 are basically the same as the operations from S802 to S806 in FIG. 8. First, in step S1702, a criterion value T of an amplitude of a response outputted from the optical sensor 120 necessary for obtaining the predetermined resolution is set. To obtain the predetermined resolution, the criterion value of the amplitude of the response outputted from the optical sensor 120 only has to be set to be equal to or larger than $T_c$ shown in FIG. 7. In S1702, a parameter k representing the number of correction steps used in the processing for calculating the moving distance C to be corrected of the position of the second carriage is set to zero.

Subsequently, in S1704, for example, a value of the amplitude of the response outputted from the optical sensor 120 is measured by reading the evaluation chart. In this case, positions of the two carriages are different from those in the case of 804 in FIG. 8. The first carriage 110 in S1704 is in a position conforming to the default setting state in the scanning scheme for fed original. The first carriage 110 does not move and the position is fixed. In S1704, the second carriage 118 is also in a position conforming to the default setting state in the scanning scheme for fed original. In the default setting state in the scanning scheme for fed original, the amplitude value of the response outputted from the optical sensor 120 is read and a value read is set as U.

In S1706, the amplitude value U of the response outputted from the optical sensor 120 read in S1704 and the criterion value T set in S1702 are compared. When the amplitude value U of the response outputted from the optical sensor 120 in the default setting state in the scanning scheme for fed original is smaller than the criterion value T, the processing shifts to a process for calculating the moving distance C to be corrected of the position of the second carriage for obtaining the predetermined resolution starting in S1708.

In S1708, the parameter k is incremented by 1. In S804 in the implementation mode shown in FIG. 8, the parameter k is decremented by 1. However, in this implementation mode, as described above, to adjust the second carriage usually in a direction toward the first carriage from the default setting state in the scanning scheme for fed original, the parameter k is incremented by 1. Since k=0, k=+1 at this stage.

Processing from S1710 to S1716 is the same as the processing from S810 to S816 explained with reference to FIG. 8. In S1710, the second carriage 118 is moved from the position of the default setting stage by $\Delta \cdot k$. At this stage, since k=+1, $\Delta \cdot k=+\Delta$. The second carriage 118 is moved from the position of the default setting state a predetermined distance $\Delta$ in the direction toward the first carriage 110. According to this processing, the position $x_2$ of the second carriage 118 is $X_{2S}+X_2+\Delta$. As it is evident from the explanation described above, according to the movement of the second carriage 118, the optical path length A changes by a distance twice as large as the moving distance of the second carriage. In S1710, the second carriage 118 is moved from the position of the default setting state the predetermined distance $\Delta$ in the direction toward the first carriage 110. Therefore, the optical path length A decreases from the value of the default setting state by $2 \cdot \Delta$. As in the case of the scanning scheme for a placed original on the glass, it is necessary to set a movement unit $\Delta$ in adjusting the position of the second carriage to a proper value.

In S1712, an amplitude value V of the response outputted from the optical sensor 120 is measured. In S1714, this amplitude value V of the response outputted from the optical sensor 120 and the amplitude value U of the response outputted from the optical sensor 120 measured in the default setting state are compared. When the amplitude value U of the response outputted from the optical sensor 120 measured in the default setting state is small compared with the amplitude value V of the response outputted from the optical sensor 120, this means that the amplitude of the response outputted from the optical sensor 120 is improved by moving the second carriage 118 in S1712. In this case, the processing proceeds to S1716 and the amplitude value V of the response outputted from the optical sensor 120 and the criterion value T are compared. When the criterion value T is larger than the amplitude value V of the response outputted from the optical sensor 120, this means that the amplitude value of the response outputted from the optical sensor 120 has not reached the criterion value T. The processing returns to S1708.

In S1708, the parameter k is incremented by 1 again. Since k=+1, k=+2 at this stage. In S1710, the second carriage 118 is moved from the position of the default setting state by 2·Δ in the direction toward the first carriage 110 while keeping the position of the first carriage 110. According to this processing, the optical path length A takes a value that decreases by 4·Δ compared with the value of the default setting state. After this, from S1712 to S1716, processing same as the processing described earlier is performed.

The processing from S1708 to S1716 is repeated several times. When it is determined in S1716 that the criterion value T is smaller than the amplitude value V of the response outputted from the optical sensor 120, this means that the amplitude of the response outputted from the optical sensor 120 has reached a value more excellent than the criterion value T. In this case, the processing proceeds to S1728, the distance Δ·k to be corrected of the position of the second carriage is stored in the memory 210, and the processing is finished.

In S1714 at a stage in the middle of the processing from S1708 to s1716, when the amplitude value U of the response outputted from the optical sensor 120 measured in the default setting state is large compared with the amplitude value V of the response outputted from the optical sensor 120 measured anew, the processing proceeds to S1718. This is because the fact that the amplitude value U of the response outputted from the optical sensor 120 measured in the default setting state is large compared with the amplitude value V of the response outputted from the optical sensor 120 means that the amplitude of the response outputted from the optical sensor 120 is not improved even by moving the second carriage 118 the predetermined distance Δ in the direction toward the first carriage 110. In S1718, the parameter k is set to −1 to change the moving direction of the second carriage 118 to a direction opposite to that in the processing performed.

In S1720, the second carriage 118 is moved from the position of the default setting state by Δ·k. At this stage, since k=−1, Δ·k=−Δ. In other words, the second carriage 118 is moved from the position of the default setting state the distance Δ in a direction away from the first carriage 110. By moving the second carriage 118 from the position of the default setting state by −Δ, the optical path length A increases from the value of the default setting state by 2·Δ.

The following processing from S1722 to S1724 is the same as the processing from S822 to S824 explained with reference to FIG. 8. In S1722, the amplitude value V of the response outputted from the optical sensor 120 is measured. In S1724, the amplitude value V of the response outputted from the optical sensor 120 is compared with the criterion value T. When the criterion value T is larger than the amplitude value V of the response outputted from the optical sensor 120, the processing proceeds to S1726. However, the processing is different from the processing in S826 shown in FIG. 8 in that the parameter k is decremented by 1 in S1726. Since k=−1, k=−2 at this stage. From S1720 to S1724, processing same as the details described above is performed.

The processing in S1726, S1720, S1722, and S1724 is repeated several times. When it is determined in S1724 that the criterion value T is smaller than the amplitude value V of the response outputted from the optical sensor 120, this means that the amplitude of the response outputted from the optical sensor 120 has reached a value more excellent than the criterion value T. The processing proceeds to S1728. In S1728, the distance Δ·k to be corrected of the position of the second carriage is stored in the memory 210 and the processing is finished.

When it is determined in S1706 that the amplitude value U of the response outputted from the optical sensor 120 is larger than the criterion value T, this means that the predetermined resolution is obtained in the default setting state. The processing proceeds to S1728. The distance Δ·k to be corrected of the position of the second carriage is calculated, the distance to be corrected is stored in the memory 210, and the processing is finished. In this case, since k=0, it is unnecessary to correct the distance at all. Thus, the processing in S1728 may be omitted.

The example of the operation for calculating the moving distance C to be corrected of the position of the second carriage for obtaining the predetermined resolution in the scanning scheme for fed original has been explained with reference to FIG. 17. In this example of the operation, the processing for always moving the second carriage by Δ is performed in the process for calculating the moving distance C to be corrected of the position of the second carriage. However, in other implementation forms, the second carriage is moved a distance different from Δ at a pre-stage of S1702 or after the processing in S1706. To perform this processing, accumulation of data and experiences are required to some extent. However, if it is possible to set a proper moving distance, it is possible to improve efficiency and increase speed of the process for calculating the moving distance C to be corrected of the position of the second carriage.

In the state shown in FIG. 16A, when the document is scanned by the scanning scheme for fed original, before scanning the document, the second carriage is moved from the default position by Δ·k stored in S1728. In scanning the document in the scanning scheme for fed original, in general, it is detected that the document is set by the ADF. Thus, it is possible to start movement of the second carriage according to this detection signal.

As an alternative method, the default position of the second carriage in the case of the scanning scheme for fed original may be changed to a position moved from the original default position by Δ·k stored in S1728.

In the scanning scheme for fed original, the original conveyed by the ADF moves along, for example, a locus indicated by the (ADF) through-read original locus 108 shown in FIG. 15A. Thus, the upper surface of the through-read glass plate 104 in the position close to the position $Q_0$ shown in the figure tends to be stained. For example, dust adhering to the original falls on the upper surface of the through-read glass plate 104 in the position close to the position $Q_0$ and is deposited. Various materials such as an ink and a toner used for showing an image on the original adhere to the upper surface of the through-read glass plate 104 in the position close to the position $Q_0$ when the original is conveyed. When the upper surface of the through-read glass plate 104 is stained because of such causes, the stain is scanned together with the original. As a result, a kind of noise due to the stain is added to a result of the scanning and deteriorates a scanned image quality.

Figure 18A:
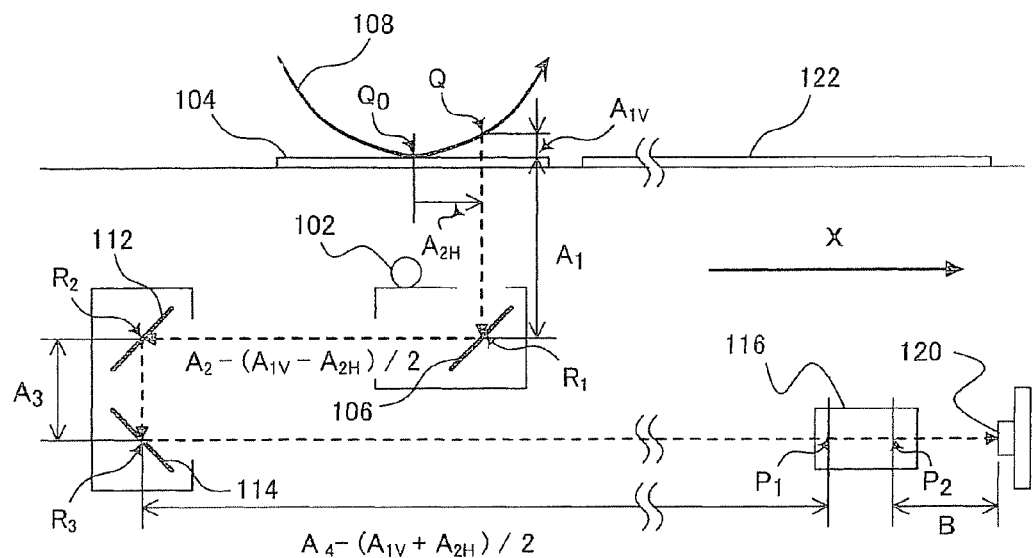
FIGS. 18A and 18B are diagrams showing optical path lengths at the time when an original is scanned in positions other than a position where the ADF through-read original locus is closest to the through-red glass surface in the scanning scheme for fed original according to the embodiment of the present invention.

To reduce this harmful influence, in original conveyance and scanning, it is effective to shift an original scanning position from $Q_0$. A diagram for explaining an optical path length in an optical system according to an embodiment of the document processing apparatus of the scanning scheme for fed original in the case in which the original scanning position is shifted from $Q_0$ to Q is shown in FIG. 18A. In this implementation mode, the original scanning position is shifted from $Q_0$ to a plus side in the X direction shown in the figure by $A_{2H}$ and moved to Q. As a result, compared with the case of the normal original scanning position shown in FIG. 15B, the optical path length A from the original scanning position to the lens 16 changes by $A_{1V}$ shown in FIG. 18A other than $A_{2H}$ and increases by $A_{2H}+A_{1V}$ in total. To offset the increase in the optical path length, the second carriage only has to be moved on the basis of an idea same as that explained with reference to FIG. 16A and the like. A distance the second carriage is moved is optimally set to $(A_{2H}+A_{1V})/2$ to a plus side in the X direction shown in FIG. 18A from the default position. As a result, as shown in FIG. 18A, an optimum path length of the optical path $R_1R_2$ from the reflection point $R_1$ on the first mirror 106 to the reflection point $R_2$ on the second mirror 112 is $A_2-(A_{1V}-A_{2H})/2$ and an optical path length of the optical path $R_3P_1$ from the reflection point $R_3$ on the third mirror 114 to the principal point of object space $P_1$ of the lens 116 is $A_4-(A_{1V}+A_{2H})/2$.

Figure 18B:
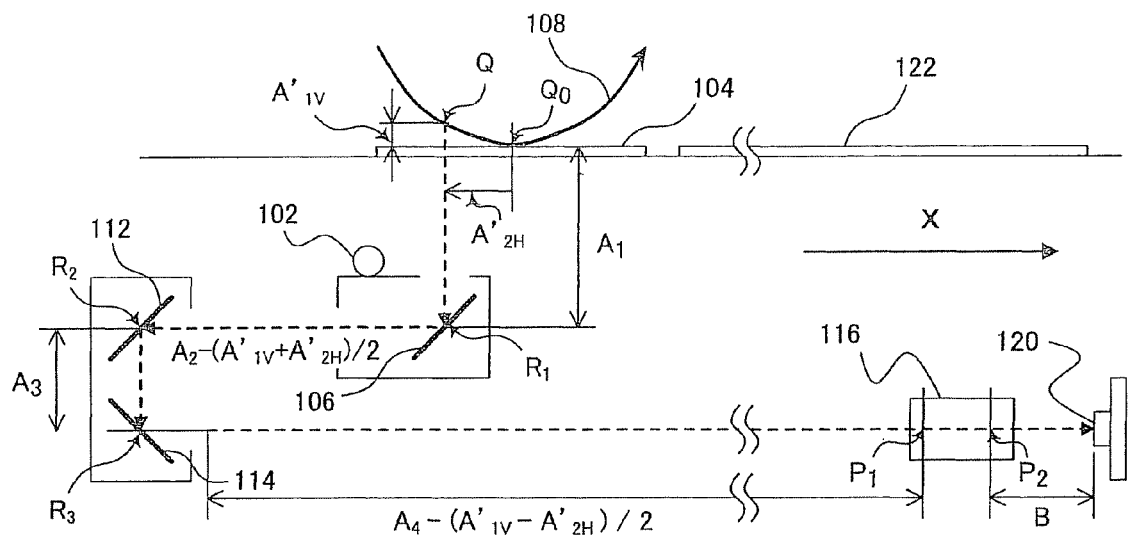

A diagram for explaining an optical path length in an optical system according to another embodiment of the document processing apparatus of the scanning scheme for fed original in the case in which the original scanning position is shifted from $Q_0$ to Q is shown in FIG. 18B. In this implementation mode, the original scanning position is shifted from $Q_0$ to a minus side in the X direction shown in the figure by $A'_{2H}$ and moved to Q. $A'_{2H}$ is a negative value. As a result, compared with the case of the ordinary original scanning position shown in FIG. 15B, the optical path length A from the original scanning position to the lens 16 changes by $A'_{1V}$ shown in FIG. 18B other than $A'_{2H}$ and changes by $A'_{2H}+A'_{1V}$ in total. To offset the increase in the optical path length, the second carriage only has to be moved on the basis of an idea same as that explained with reference to FIG. 16A and the like. A distance the second carriage is moved is optimally set to $(A'_{2H}+A'_{1V})/2$ to a plus side in the X direction shown in FIG. 18B from the default position. As a result, as shown in FIG. 18B, an optimum length of the optical path $R_1R_2$ from the reflection point $R_1$ on the first mirror 106 to the reflection point $R_2$ on the second mirror 112 is $A_2-(A'_{1V}+A'_{2H})/2$ and an optical path length of the optical path $R_3P_1$ from the reflection point $R_3$ on the third mirror 114 to the principal point of object space $P_1$ of the lens 116 is $A_4-(A'_{1V}-A'_{2H})/2$.

In the implementation forms of the scanning scheme for fed original shown in FIGS. 18A and 18B, an operation for calculating the moving distance C to be corrected of the position of the second carriage for obtaining the predetermined resolution is the same as the operation explained with reference to FIG. 17 except that processing for inputting a desired moving distance to the first carriage driving-control unit 202 and moving the first carriage by the distance is added before the measurement of the output amplitude U from the optical sensor in S1704 shown in FIG. 17 and processing for storing the moving distance in the memory 204 is added to the S1728 shown in FIG. 17.

In FIG. 17, k is incremented in S1708, set as k=−1 in S1718, and decremented in S1726. However, opposite processing is also possible. In other words, it is evident that k may be decremented in S1708, set as K=+1 in S1718, and incremented in S1726.

When a document is scanned by the scanning scheme for fed original in the state shown in FIG. 18A or FIG. 18B, the second carriage is controlled in the same manner as the time when a document is scanned by the scanning scheme for fed original in the state shown in FIG. 16A. In other words, before scanning the document, the second carriage is moved from the default position by Δ·k stored in S1728. As an alternative method, the default position of the second carriage in the case of the scanning scheme for fed original is changed to a position moved by Δ·k stored in S1728 from the original default position.

The embodiments of the present invention have been explained. According to the present invention, in a document processing apparatus with a small depth of field in which an image point shifts and resolution of a scanned image is deteriorated, it possible to correct deterioration in resolution due to assembly fluctuation of the apparatus, dimension fluctuation of members, and the like. It is possible to always provide image data with resolution that satisfies the standard. Taking into account the recent trend of the increase in resolution in document processing apparatuses, those having ordinary skill in the art would understand that the present invention becomes increasingly important.

Although exemplary embodiments of the present invention have been shown and described, it will be apparent to those having ordinary skill in the art that a number of changes, modifications, or alterations to the present invention as described herein may be made, none of which depart from the spirit of the present invention. All such changes, modifications, and alterations should therefore be seen as within the scope of the present invention.

For example, concerning a method of correcting a position of the second carriage in the fixed original scanning system, the method of calculating moving distances to be corrected of the position of the second carriage for obtaining the predetermined resolution in positions of two places within the moving range of the first carriage 110 is explained above. However, it is also possible to calculate moving distances to be corrected of the position of the second carriage for obtaining the predetermined resolution in three or more places within the moving range of the first carriage 110 and estimating, from these values, a moving distance to be corrected from the default position of the second carriage 118 in an arbitrary position within the moving range of the first carriage 110 according to an algorithm of linear approximation by the method of least squares or spline interpolation.

Moreover, concerning an operation for correcting a position of the second carriage in the fixed original scanning system, as the first embodiment, the method of correcting the position of the second carriage stepwise from the default position when the first carriage is in a discrete position is explained. As the second embodiment, the method of steadily correcting the position of the second carriage from the default position regardless of a position of the first carriage is explained. However, those having ordinary skill in the art would understand that a hybrid embodiment of the two embodiments, in other words, an embodiment obtained by combining the two embodiments is also within the scope of the present invention.

What is claimed is:

1. A method of correcting image scanning resolution of a document processing apparatus, the document processing apparatus including a first reflector that reflects reflected light from a document as an image scanning object in a predetermined direction, a second reflector that reflects the outputted light from the first reflector by substantially 180°, a lens that converges the outputted light from the second reflector, and an optical sensor that detects an image of the document imaged by the lens, the method comprising:

obtaining parameters related to correction of the second reflector from a default position thereof in advance;

storing a part or all of the parameters obtained; and controlling a position of the second reflector in accordance with the parameters stored.

2. The method of correcting image scanning resolution of a document processing apparatus according to claim 1, wherein the method of obtaining the parameters related to correction of the second reflector from a default position thereof further comprising:

setting a criterion value relating to an amplitude value of a response outputted from the optical sensor when an evaluation chart appropriate for evaluating resolution, which corresponds to image scanning resolution better than a specified value of the image scanning resolution of the document processing apparatus, is read:

obtaining a correction distance that is a distance the second reflector should be moved from the default position in a sub-scanning direction until an amplitude value of a response outputted from the optical sensor in a predetermined position in the sub-scanning direction of the first reflector increases to be equal to or larger than the criterion value; and calculating the parameters associated with correction of the second reflector from the default position, which satisfies the specified value of the image scanning resolution of the document processing apparatus in scanning an image of the document, on the basis of the correction distance of the second reflector from the default position in a position in the sub-scanning direction of the first reflector in the one or plural predetermined positions.

3. The method of correcting image scanning resolution of a document processing apparatus according to claim 2, wherein the correction distance that is a distance the second reflector should be moved in the sub-scanning direction from the default position until an amplitude value of a response outputted from the optical sensor in a position predetermined in the sub-scanning direction of the first reflector increases to be equal to or larger than the criterion value is obtained by repeating, until a measurement result of the amplitude of the response outputted from the optical sensor increases to be equal to or larger than the criterion value, processing for:

reading the evaluation chart appropriate for evaluating the resolution in a default state of an operation of the second reflector;

measuring an amplitude value of a response outputted from the optical sensor in the position predetermined in the sub-scanning direction of the first reflector;

comparing the amplitude value of the response outputted from the optical sensor measured with the criterion value;

moving, when the amplitude value measured is smaller than the criterion value, the second reflector to a different position from a position in a state at the time when the amplitude value of the response has been measured;

reading, in this setting state, the evaluation chart for evaluating the resolution;

measuring the amplitude in the predetermined position in the sub-scanning direction of the first reflector; and comparing the amplitude value measured with the criterion value.

4. The method of correcting image scanning resolution of a document processing apparatus according to claim 3, wherein the scanning of an image is an original fixing and scanning scheme, and the parameters associated with correction of one or plural positions of the second reflector in scanning the image are calculated based on the correction distances of the second reflector from the default position in a plurality of the predetermined positions in the sub-scanning direction of the first reflector.

5. The method of correcting image scanning resolution of a document processing apparatus according to claim 4, wherein the parameters associated with correction of one or plural positions of the second reflector in scanning the image are obtained based on the correction distances of the second reflector from the default position in a couple of the predetermined positions in the sub-scanning direction of the first reflector, and the correction distance of the second reflector from the default position in an arbitrary position in the sub-scanning direction of the first reflector is estimated by linearly approximating moving distances that should be corrected of the second reflector from the default state in the couple of the predetermined positions in the sub-scanning direction of the first reflector.

6. The method of correcting image scanning resolution of a document processing apparatus according to claim 5, wherein the parameters associated with correction of the second reflector from the default position in scanning an image to satisfy the specified value of the image scanning resolution of the document processing apparatus on the basis of the correction distance of the second reflector from the default position in the predetermined position in the sub-scanning direction of the first reflector are obtained on the basis of:

the correction distance of the second reflector from the default position in the arbitrary position in the sub-scanning direction of the first reflector estimated by the linear interpolation; and a range of the correction distance of the second reflector from the default position corresponding to a range in which the specified value of the image scanning resolution is satisfied.

7. The method of correcting image scanning resolution of a document processing apparatus according to claim 6, wherein when the correction distance of the second reflector from the default position in a sub-scanning start position of the first reflector estimated by the linear approximation is a value outside the range of the correction distance of the second reflector from the default position corresponding to the range in which the specified value of the image scanning resolution is satisfied, the parameters associated with correction of the second reflector from the default position are obtained such that a position of the second reflector in the sub-scanning start position of the first reflector is within the range of the correction distance of the second reflector from the default position corresponding to the range in which the specified value of the image scanning resolution is satisfied from the default position, and the parameters obtained are stored.

8. The method of correcting image scanning resolution of a document processing apparatus according to claim 7, wherein the second reflector moves at default speed after start of sub-scanning until an earlier point of a point when the sub-scanning is completed and a point immediately before the correction distance of the second reflector from the default position in the position in the sub-scanning direction of the first reflector estimated by the linear approximation reaches an upper limit value or a lower limit value, i.e., one of boundary values in the range of the correction distance of the second reflector from the default position corresponding to the range in which the specified value of the image scanning resolution is satisfied, when the correction distance reaches the one of the boundary values before the sub-scanning is completed, the correction distance of the second reflector in the default position in the position in the sub-scanning direction of the first reflector is corrected from the one boundary value to the other boundary value such that the movement of the second reflector starts at the point immediately before the correction distance reaches the one boundary value and ends at a point when the correction distance reaches the one boundary value, after this correction ends, the parameters associated with correction of the second reflector from the default position are calculated such that the movement of the second reflector at the default speed and the correction of the movement distance, which should be corrected from the default position, from the one boundary value to the other boundary value are repeated until the sub-scanning is completed, and the parameters calculated are stored.

9. The method of correcting image scanning resolution of a document processing apparatus according to claim 7, wherein after start of sub-scanning, concerning the correction distance of the second reflector from the default position in a position in a sub-scanning direction of the first reflector estimated by the linear approximation, when an area outside a range of the correction distance of the second reflector from the default position corresponding to the range in which the specified value of the image scanning resolution is satisfied is present in a sub-scanning area, the parameters associated with correction of the second reflector from the default position are calculated such that the second reflector moves at constant speed at which the correction distance of the second reflector from the default position in the position in the sub-scanning direction of the first reflector is within the range of the correction distance from the position of the second reflector from the default position corresponding to the range in which the specified value of the image scanning resolution is satisfied, and the parameters calculated are stored.

10. The method of correcting image scanning resolution of a document processing apparatus according to claim 4, wherein the parameters associated with correction of a position of the second reflector in scanning the image are obtained based on the correction distances of the second reflector from the default position in predetermined more than three positions in the sub-scanning direction of the first reflector, and the correction distance of the second reflector from the default position in an arbitrary position in the sub-scanning direction of the first reflector and a moving distance to be corrected of the second reflector from the default position in the predetermined more than three positions in the sub-scanning direction of the first reflector are estimated with either algorithm of linear approximation by least-square method or spline interpolation.

11. The method of correcting image scanning resolution of a document processing apparatus according to claim 3, wherein the scanning of an image is an original conveying and scanning scheme, and the parameters associated with correction of a position of the second reflector in scanning the image are obtained based on the correction distance of the second reflector, which is located in a place where the image is scanned of the first reflector, from the default position.

12. The method of correcting image scanning resolution of a document processing apparatus according to claim 11, wherein the first reflector is further moved a predetermined distance before a distance in the sub-scanning direction the second reflector should be moved from the default position until the amplitude value increases to be equal to or larger than the criterion value is obtained, and the distance the first reflector is moved is stored.

13. The method of correcting image scanning resolution of a document processing apparatus according to claim 1, wherein the document processing apparatus is any one of a scanner apparatus, a copier, a facsimile apparatus, and a multi-function peripheral that has two or more functions among functions of these apparatuses.

14. A document processing apparatus that has a function of correcting image scanning resolution, comprising, a light source that illuminates an original as a scanning object;

a first reflecting member mounted with a first reflector that reflects light reflected from the original in a predetermined direction;

a second reflecting member mounted with a second reflector that reflects the outputted light from the first reflector to change the light propagation direction by 180°;

a lens that converges the outputted light from the second reflector;

an optical sensor that receives an image of the original imaged by the lens and converts the image into an electric signal;

a first reflector driving device that moves the first reflector;

a first reflector-driving control device that controls the first reflector driving device;

a first storage device that stores control parameters, including parameters of a default setting state, that define control operations by the first reflector-driving control device;

a second reflector driving device that moves the second reflector in a direction substantially identical with a direction of movement of the first reflector;

a second reflector-driving control device that associates the second reflector driving device with a position of the first reflector and controls the second reflector driving device in accordance with parameters of the default setting state and parameters associated with correction of the second reflector from a default position thereof obtained in advance; and a second storage device that stores the parameters of the default setting state that define control operations by the second reflector-driving control device and the parameters associated with correction of the second reflector from the default position obtained in advance.

15. The document processing apparatus that has a function of correcting image scanning resolution according to claim 14, wherein the parameters associated with correction of the second reflector from the default position are obtained by:

setting a criterion value relating to an amplitude value of a response outputted from the optical sensor when an evaluation chart appropriate for evaluating resolution, which corresponds to image scanning resolution better than a specified value of the image scanning resolution of the document processing apparatus, is read;

obtaining a correction distance that is a distance the second reflector should be moved from the default position in a sub-scanning direction until an amplitude value of a response outputted from the optical sensor in a predetermined position in the sub-scanning direction of the first reflector increases to be equal to or larger than the criterion value; and calculating the parameters associated with correction of the second reflector from the default position, which satisfies the specified value of the image scanning resolution of the document processing apparatus in scanning an image of the document, on the basis of the correction distance of the second reflector from the default position in a position in the sub-scanning direction of the first reflector in the one or plural predetermined positions.

16. The document processing apparatus that has a function of correcting image scanning resolution according to claim 15, wherein the scanning of an image is an scanning scheme for a placed original on the glass, and the parameters associated with correction of a position of the second reflector in scanning the image are obtained based on the correction distances of the second reflector from the default position in a plurality of the predetermined positions in the sub-scanning direction of the first reflector.

17. The document processing apparatus that has a function of correcting image scanning resolution according to claim 16, wherein the parameters associated with correction of a position of the second reflector in scanning the image are obtained based on the correction distances of the second reflector from the default position in a couple of the predetermined positions in the sub-scanning direction of the first reflector, and the correction distance of the second reflector from the default position in an arbitrary position in the sub-scanning direction of the first reflector is estimated by linearly approximating moving distances that should be corrected of the second reflector from the default state in the couple of the predetermined positions in the sub-scanning direction of the first reflector.

18. The document processing apparatus that has a function of correcting image scanning resolution according to claim 17, wherein the parameters associated with correction of the second reflector from the default position in scanning an image to satisfy the specified value of the image scanning resolution of the document processing apparatus on the basis of the correction distance of the second reflector from the default position in the predetermined position in the sub-scanning direction of the first reflector are obtained on the basis of:

the correction distance of the second reflector from the default position in the arbitrary position in the sub-scanning direction of the first reflector estimated by the linear interpolation; and a range of the correction distance of the second reflector from the default position corresponding to a range in which the specified value of the image scanning resolution is satisfied.

19. The document processing apparatus that has a function of correcting image scanning resolution according to claim 18, wherein when the correction distance of the second reflector from the default position in a sub-scanning start position of the first reflector estimated by the linear approximation is a value outside the range of the correction distance of the second reflector from the default position corresponding to the range in which the specified value of the image scanning resolution is satisfied, the parameters associated with correction of the second reflector from the default position are obtained such that a position of the second reflector in the sub-scanning start position of the first reflector is within the range of the correction distance of the second reflector from the default position corresponding to the range in which the specified value of the image scanning resolution is satisfied from the default position, and the parameters obtained are stored.

20. The document processing apparatus that has a function of correcting image scanning resolution according to claim 19, wherein the second reflector moves at default speed after start of sub-scanning until an earlier point of a point when the sub-scanning is completed and a point immediately before the correction distance of the second reflector from the default position in the position in the sub-scanning direction of the first reflector estimated by the linear approximation reaches an upper limit value or a lower limit value, i.e., one of boundary values in the range of the correction distance of the second reflector from the default position corresponding to the range in which the specified value of the image scanning resolution is satisfied, when the correction distance reaches one of the boundary values before the sub-scanning is completed, the correction distance of the second reflector in the default position in the position in the sub-scanning direction of the first reflector is corrected from the one boundary value to the other boundary value such that the movement of the second reflector starts at the point immediately before the correction distance reaches the one boundary value and ends at a point when the correction distance reaches the one boundary value, after this correction ends, the parameters associated with correction of the second reflector from the default position are calculated such that the movement of the second reflector at the default speed and the correction of the movement distance, which should be corrected from the default position, from the one boundary value to the other boundary value are repeated until the sub-scanning is completed, and the parameters calculated are stored.

21. The document processing apparatus that has a function of correcting image scanning resolution according to claim 19, wherein after start of sub-scanning, concerning the correction distance of the second reflector from the default position in a position in a sub-scanning direction of the first reflector estimated by the linear approximation, when an area outside a range of the correction distance of the second reflector from the default position corresponding to the range in which the specified value of the image scanning resolution is satisfied is present in a sub-scanning area, the parameters associated with correction of the second reflector from the default position are calculated such that the second reflector moves at constant speed at which the correction distance of the second reflector from the default position in the position in the sub-scanning direction of the first reflector is within the range of the correction distance from the position of the second reflector from the default position corresponding to the range in which the specified value of the image scanning resolution is satisfied, and the parameters calculated are stored.

22. The document processing apparatus that has a function of correcting image scanning resolution according to claim 16, wherein the parameters associated with correction of a position of the second reflector in scanning the image are obtained based on the correction distances of the second reflector from the default position in the predetermined more the three positions decided in advance in the sub-scanning direction of the first reflector, and the correction distance of the second reflector from the default position in an arbitrary position in the sub-scanning direction of the first reflector and a moving distance to be corrected of the second reflector from the default position in the predetermined more the three positions in the sub-scanning direction of the first reflector are estimated with either algorithm of linear approximation by least-square method or spline interpolation.

23. The document processing apparatus that has a function of correcting image scanning resolution according to claim 15, wherein the scanning of an image is an original conveying and scanning scheme, and the parameters associated with correction of a position of the second reflector in scanning the image are obtained based on the correction distance of the second reflector, which is located in a place where the image is scanned of the first reflector, from the default position.

24. The document processing apparatus that has a function of correcting image scanning resolution according to claim 23, wherein the first reflector is further moved a predetermined distance before a distance in the sub-scanning direction the second reflector should be moved from the default position until the amplitude value increases to be equal to or larger than the criterion value is calculated, and the distance the first reflector is moved is stored.

25. The document processing apparatus that has a function of correcting image scanning resolution according to claim 15, wherein the document processing apparatus is any one of a scanner apparatus, a copier, a facsimile apparatus, and a multi-function peripheral that has two or more functions among functions of these apparatuses.

26. The document processing apparatus that has a function of correcting image scanning resolution according to claim 15, wherein the first storage device includes a nonvolatile memory, and the second storage device includes a nonvolatile rewritable memory.

27. The document processing apparatus that has a function of correcting image scanning resolution according to claim 24, wherein the first storage device further includes a nonvolatile rewritable memory.

28. The document processing apparatus that has a function of correcting image scanning resolution according to claim 15, wherein the optical sensor is a linear image sensor and has either semiconductor device structure of CCD or CMOS.

29. The document processing apparatus that has a function of correcting image scanning resolution according to claim 15, wherein the first reflector-driving unit and the second reflector-driving unit include a pulse motor as driving source, respectively.

30. The document processing apparatus that has a function of correcting image scanning resolution according to claim 15, wherein the second reflector is a reflector in which two plane mirrors are arranged such that reflection surfaces thereof are substantially orthogonal to each other.

31. The document processing apparatus that has a function of correcting image scanning resolution according to claim 15, further comprising a circuit that detects amplitude of an envelope of a response for a predetermined main scanning area portion outputted from the optical sensor.

* * * * *